(12) United States Patent
Wang et al.

(10) Patent No.: US 7,809,716 B2
(45) Date of Patent: Oct. 5, 2010

(54) METHOD AND APPARATUS FOR ESTABLISHING RELATIONSHIP BETWEEN DOCUMENTS

(75) Inventors: Qing Bo Wang, Beijing (CN); Wei Zhu Chen, Beijing (CN); Ben Fei, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 11/740,431

(22) Filed: Apr. 26, 2007

(65) Prior Publication Data

US 2007/0299826 A1 Dec. 27, 2007

(30) Foreign Application Priority Data

Jun. 27, 2006 (CN) .................. 2006 1 0094219

(51) Int. Cl.
*G06F 7/00* (2006.01)
(52) U.S. Cl. ..................... 707/721; 707/724
(58) Field of Classification Search ............ None
See application file for complete search history.

(56) References Cited

U.S. PATENT DOCUMENTS

| | | | | |
|---|---|---|---|---|
| 5,749,081 A * | 5/1998 | Whiteis | ............... | 707/102 |
| 6,012,053 A * | 1/2000 | Pant et al. | ............... | 1/1 |
| 6,065,001 A * | 5/2000 | Ohkubo et al. | .......... | 707/3 |
| 6,502,091 B1 * | 12/2002 | Chundi et al. | .......... | 707/3 |
| 6,633,868 B1 | 10/2003 | Min et al. | | |
| 6,640,218 B1 * | 10/2003 | Golding et al. | ......... | 707/2 |
| 6,654,742 B1 * | 11/2003 | Kobayashi et al. | ........ | 1/1 |
| 7,149,732 B2 * | 12/2006 | Wen et al. | .............. | 707/4 |
| 2001/0021914 A1 * | 9/2001 | Jacobi et al. | .......... | 705/8 |
| 2002/0049752 A1 * | 4/2002 | Bowman et al. | .......... | 707/3 |
| 2002/0123988 A1 * | 9/2002 | Dean et al. | .......... | 707/3 |
| 2002/0161747 A1 * | 10/2002 | Li et al. | ............... | 707/3 |
| 2003/0101286 A1 | 5/2003 | Kolluri et al. | | |
| 2003/0135828 A1 | 7/2003 | Dockter et al. | | |
| 2003/0220916 A1 * | 11/2003 | Imaichi et al. | ........ | 707/3 |
| 2005/0021397 A1 * | 1/2005 | Cui et al. | ............ | 705/14 |
| 2005/0055341 A1 * | 3/2005 | Haahr et al. | .......... | 707/3 |
| 2005/0071741 A1 * | 3/2005 | Acharya et al. | ........ | 715/500 |
| 2005/0120311 A1 * | 6/2005 | Thrall | ................ | 715/811 |
| 2005/0125391 A1 * | 6/2005 | Curtis et al. | .......... | 707/3 |
| 2005/0192957 A1 * | 9/2005 | Newbold | ............. | 707/5 |
| 2006/0005113 A1 | 1/2006 | Baluja et al. | | |
| 2006/0015504 A1 * | 1/2006 | Yu et al. | ........... | 707/10 |
| 2007/0112768 A1 * | 5/2007 | Majumder | ........... | 707/7 |
| 2007/0255689 A1 * | 11/2007 | Sun et al. | ........... | 707/3 |
| 2008/0208841 A1 * | 8/2008 | Zeng et al. | .......... | 707/5 |

\* cited by examiner

*Primary Examiner*—Neveen Abel Jalil
*Assistant Examiner*—Vei-Chung Liang
(74) *Attorney, Agent, or Firm*—Yuanmin Cai

(57) ABSTRACT

The present invention is directed to a method and apparatus for establishing documents relationship based on user's operation upon search result. When a user uses search engine to search for documents with a query in repository, the search result may be a list of ranked documents, and these documents may contain a lot of relationship in term of the specific query. If the user clicks some search result further, and if the click and open operation meet certain conditions, for example exceed a period of time, the clicked document could be deemed as related to the search query. Furthermore it could be inferred that there is a strong relationship between different documents clicked by the user. The present invention records the relationship between documents and presents it to the user when necessary.

17 Claims, 23 Drawing Sheets

Local Desktop Search Engine

METHOD AND APPARATUS FOR ESTABLISHING RELATIONSHIP BETWEEN DOCUMENTS

CROSS-REFERENCE TO RELATED APPLICATIONS

The present application claims the benefit of priority of a Chinese patent application No. 200610094219.8 filed Jun. 27, 2006 in the State Intellectual Property Office of the People's Republic of China, the content of which is incorporated herein by reference in its entirety.

FIELD OF THE INVENTION

The present invention generally relates to method and apparatus for establishing relationship between documents, and more particularly, for establishing relationship between documents according to the history of a user's operation upon search results.

BACKGROUND OF THE INVENTION

Normally, multiple documents, sometimes up to the millions, are stored in a personal computer or network storage. Although these documents may seem to be independent, many of them are directly or indirectly related by for example their contents. Information on relationship between documents may be very important in reality from a user's perspective. For example, an R&D (research and development) person may want to understand a technical trend in a particular field by searching related documents associated with one document. However, there is no solution provided in prior art such that related documents may be checked out in term of an entry document.

Under current practice, a user may need to read each document personally, determine relationship between documents, and then store the documents containing relevant contents into a same folder, thus establishing documents relationship. In most cases, the user will sort documents by tree-based directory. But the drawback of this approach is apparent: it can hardly indicate the relationship between documents at different levels or in different folders. For example, Doc A may tell how to use motion editor, so it is stored in a directory "instruction manual". Actually, Doc A has closer/stronger relationship with Doc B stored in another directory, telling how to make motion picture, which is stored in the directory of "technical news". Under such circumstance, unless the user has prior knowledge about the content of the two documents, He/she can hardly find the substantial relationship between documents stored in different directories. Furthermore, with the above manual approach, the user is required to regularly tidy documents in different directories; for those who have tons of documents stored, that is very time-consuming and complicated task.

Prior art only provides a method to establish relationship between search query and documents in search result. This method is particularly used in Internet-based search, such as search at website www.delphion.com. In this Internet-based search, when a key word, patent application number for example, is inputted by a user, a list of search results will be returned, which may include a series of hyperlinks associated with corresponding search results, and the results list may be arranged in terms of the relevance degree with the key words. The highest relevance degree is typically represented as 100%. When determining the relevance degree, things that are frequently considered are whether a key word is present at specific locations within a document and how often a key word appears in the document. That means if key words appear on specific locations within the document, or the number of their appearances in the document is most, then it may be deemed that the search result is most related to the keywords.

However, the above approach merely helps to determine the relationship between document and search query, instead of the relationship between documents. When a user needs to find other documents related to a certain document, the user has to read the document to generalize corresponding keywords, and input them into search engine to conduct search. The manual operation is not only prone to errors but also burdensome and time consuming. Additionally, it stores nothing about the document relationship. Thus, when a user fails to remember the related documents that he searched out a few days ago, he has to input the same key words again for repeated searching and browsing.

Additionally, relationship reflected in the approach is static, rather than dynamic and can not be updated automatically along with the user's search experience. This means although a document may contain a number of key words, it is not always the really desired one. Especially when a key word selected by the user can represent two different meanings, the search engine may provide totally unrelated result. For example, when a user input "windows" as a key word, search results may comprise both real "window" (i.e. a framework enclosing a pane of glass) and Windows Operating System.

Therefore, there is a need in the art for an easy, dynamic method and apparatus for establishing and checking documents relationship.

SUMMARY OF THE INVENTION

Embodiments of the present invention provide a method and apparatus for establishing documents relationship based on user's operation upon search results. When a user using search engine to search for documents in repository with a query, search results may be a list of documents being ranked, and these documents may have relationship with each other in term of the specific query. If the user clicks document(s) in the search result further, and if the clicking operation meets certain condition(s), for example exceeding a certain period of time, the clicked document could be deemed as indeed related to the search query. Furthermore, it could be inferred that there is a strong relationship between different documents clicked by the user. The present invention records the documents relationship that come into being during the course of searching and presents the relationship to the user when necessary.

According to one embodiment, the present invention provides a method of establishing documents relationship in term of a user's operation upon document search result, wherein the document search result is obtained from a search based on one or more search queries: monitoring the user's operation upon the search result, and obtaining one or more documents selected by the user according to the operation; for the selected document(s), storing a related document list; and obtaining documents relationship according to the related document list, wherein, the documents relationship is depicted at least by using the search query.

According to another embodiment, the present invention provides a method for checking related document according to the documents relationship. The method may include receiving an entry document selected by a user; checking the related document which has relationship with the entry document; and returning a checking result which contains the related document to the user.

According to yet another embodiment, the present invention provides an apparatus of establishing relationship between documents in term of a user's operation upon document search result, wherein the document search result is obtained from a search based on one or more search queries: a means for monitoring the user's operation upon the search result, and obtaining one or more documents selected by the user according to the operation; a means for storing a related document list for the selected document(s); and a means for obtaining documents relationship according to the related document list, wherein, the documents relationship is depicted at least by using the search query.

According to another embodiment, the present invention provides an apparatus for checking the related document according to documents relationship. The apparatus may include a means for receiving an entry document selected by a user; a means for checking the related document which has relationship with the entry document; and a means for returning a checking result which contains the related document to the user.

The present invention has following advantages: 1) ensure that the relationship built between at least a pair of documents has a certain level of relativity. Since the relationship is based on user's operation upon search result, the present invention creatively leverage the user's reading ability and intellect: normally, only the document that a user spends enough time to read can be deemed as an ideal search result, hence having substantial relationship with other documents. Accordingly, undesirable search result can be filtered out. 2) Since the documents relationship can be dynamically built and can be constantly updated based on user's search habit, the documents relationship in present invention can be continually modified, to adequately reflect the real state of relationship. Additionally, 3) the present invention establishes a documents relationship that is truly personalized (special for each person). 4) Under the present invention, both documents relationship establishing process and checking process are performed automatically without any additional effort from the user. The present invention does not need sophisticated operation; only simple method of computing and storing is enough, bringing little extra overhead to the whole system.

The advantages of present invention are generally illustrated in above description. For a more complete understanding of these and other advantages, a detailed description is made as following with reference to the accompanying drawings.

BRIEF DESCRIPTION OF THE DRAWINGS

It is to be noted that the appended drawings illustrate only typical embodiments of this invention and are therefore not to be considered limiting to its scope.

FIGS. 9A-9D illustrate user interface screens used for checking related document(s)

DETAILED DESCRIPTION OF THE PREFERRED EMBODIMENTS

In the following discussion, numerous specific details are set forth to provide a thorough understanding of the present invention. However, it will be obvious to those skilled in the art that the present invention may be understood without such specific details. It should be further noted that any particular nomenclature that follows is used merely for convenience, and thus the invention should not be limited to use solely in any specific application identified and/or implied by such nomenclature.

Unless indicated otherwise, all functions described herein may be performed in either hardware or software, or some combination thereof. In a preferred embodiment, however, the function is performed by a processor such as a computer or an electronic data processor in accordance with code such as computer program code, or integrated circuits that are coded to perform such function. In general, the routines executed to implement the embodiments of the invention, may be part of an operation or a specific application, component, program, module, object or sequence of instructions. The software of the present invention typically is comprised of a multitude of instructions that will be translated by the native computer into a machine-readable format and hence executable instructions. Also programs are comprised of variables and data structures that either reside locally to the program or are found in memory or on storage devices. In addition, various programs described hereinafter may be identified based upon the application for which they are implemented in a specific embodiment of the invention. Such signal-bearing media, when carrying computer-readable instructions that direct the functions of the present invention, represent embodiments of the present invention.

Firstly a few nomenclatures that are used in this invention will be defined as following:

Document: document in this invention does not limited to text-based document, such as doc, ppt, pdf, rather it can be in any format, including audio, video, even executable file.

Search query: means all the queries that can be inputted by a user for conducting search in a search engine system, including key words, field of key words, document type, last modified time, document author, and all the other advanced options.

Document Search Result List: means the list containing all the documents returned to the user after conducting search by a search engine.

Following are detailed embodiments with reference to accompanying drawings.

Figure 1A:
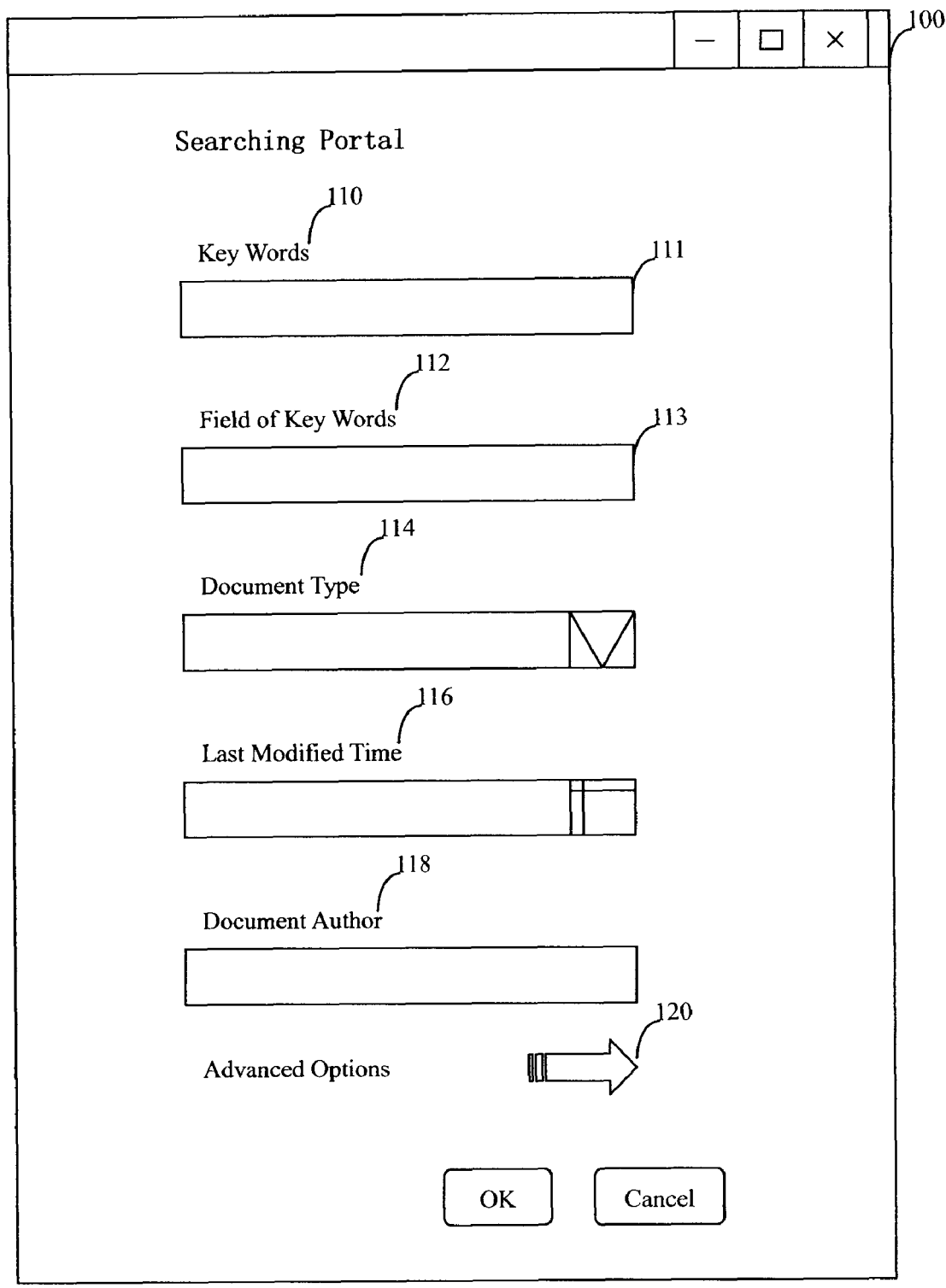
FIG. 1A illustrates a user interface screen of a searching portal in prior art.

FIG. 1A is a user interface screen of a searching portal in prior art. Generally speaking, the user interface 100 contains a numbers of input fields, where a user can fill in his search formula. A series of popular search items are illustrated in this FIGURE, wherein key words section 110 doesn't means that the search engine will conduct searching exactly in terms of key words 111 inputted by the user; moreover, it is appreciated by the person skilled in the art that the search engine can also automatically extend search query(s) by techniques such as fuzzy search. For example, where a user inputs a keyword 111 "mao xiong" (pronunciation of Panda in China Taiwan) in a search engine having a certain level of knowledge (not shown in the FIGURE), the search engine can conduct search according to both "xiong mao" (pronunciation of Panda in China Mainland) and "mao xiong". Field of key words 112 represents a generic concept of the key words that a user would input, which can help to expand the searching ability of search engine. For instance, when a user fills "animal" in the field of key words section 113, a search engine having a certain level of information stored (not shown in the FIG-URE), can conduct semantic analysis with regard to user's input, and then find all kinds of animals related documents for the user. Such search engine, normally, will be a professional search engine program which focuses on one or a few certain categories. Document type section 114 represents the storage format of a document, including doc, txt, pdf, ppt, etc. Apart from the above, search queries can also include last modified time 116 and document author 118, and all of other advanced options 120. Search queries shown in the FIGURE can be combined by the logic rules of "AND", "OR", "NOT". Therefore, the search query mentioned below can represent either a single search query, like a key word, or the combination of various search queries, like combined keywords with "AND", "OR", "NOT". Search queries hereinafter do not limit to the illustrations shown in the FIGURE; rather they could be further designed according to any specific requirement and demand of search engine. The present invention provides a number of embodiments by using illustrated key words, which does not mean other search queries can not be used in the present invention.

Figure 1B:
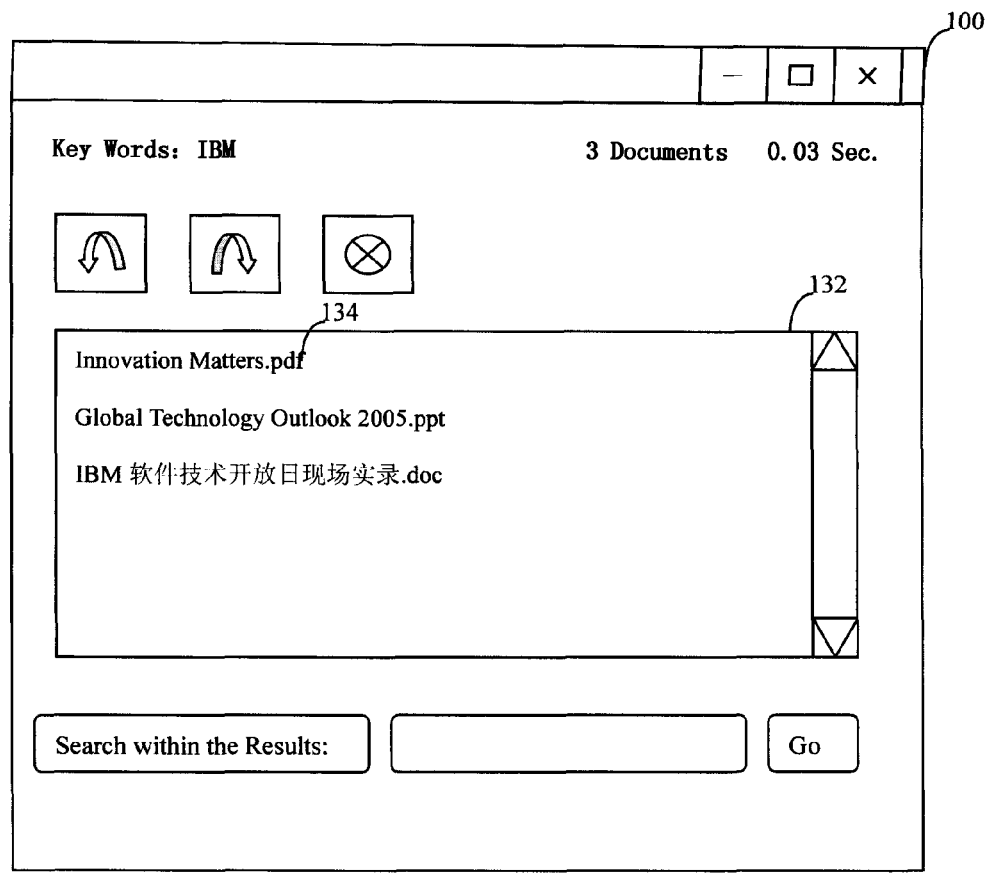
FIG. 1B illustrates a user interface screen indicating a searching result returned by a search engine in prior art.

FIG. 1B is a user interface 100 screen indicating a searching result returned by a search engine in prior art. All the search results 134 will be shown in a result representing section 132. Although it does not shown in the FIGURE, the person skilled in the art can understand that the result representing section 132 can represent much more abundant information with regards to the search result 134, comprising relevance degree between the search result 134 and the key words 111, document type of the search result 134, last modified time, author, and snippet, wherein the "snippet" normally includes a paragraph of message containing the key words, which is to help the user catch the content of the search result 134 soon. Of course, the user can find the content of documents shown in the result representing section 132 by clicking each search result.

Figure 2:
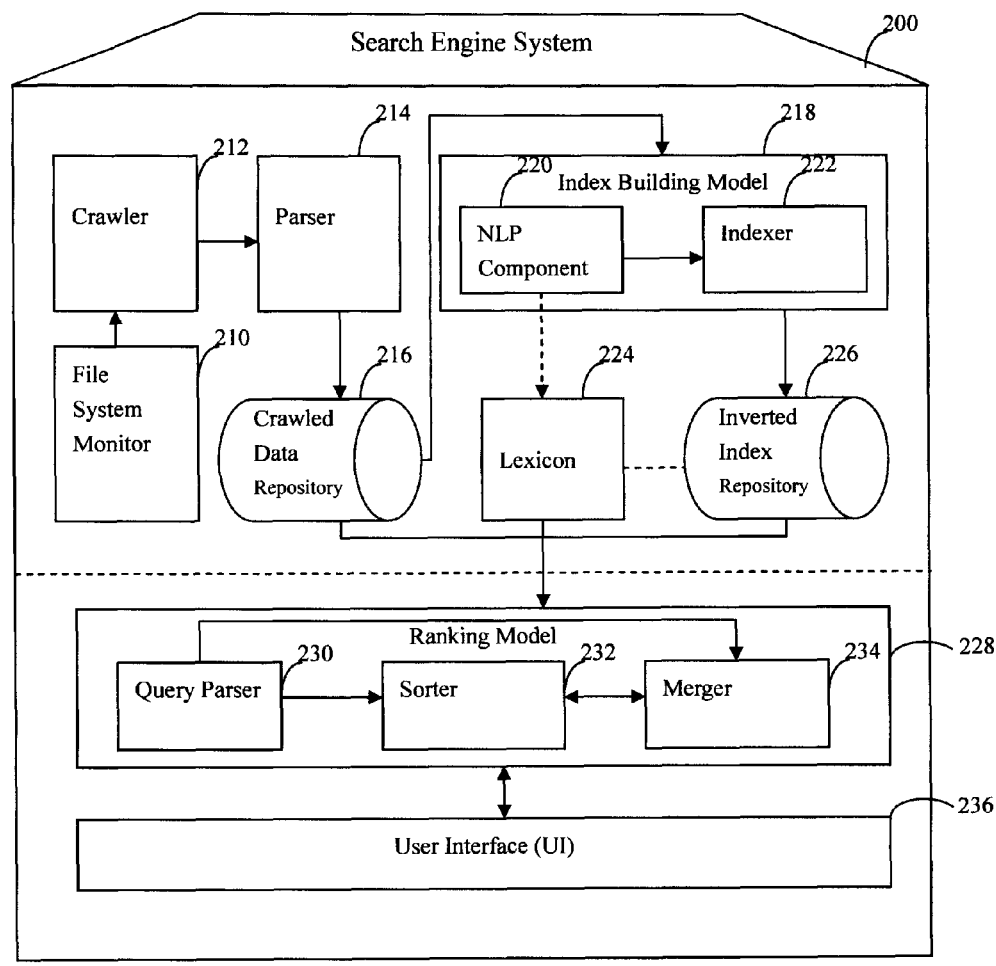
FIG. 2 illustrates a block diagram of a search engine in prior art.

FIG. 2 is a block diagram of a search engine 200 in prior art. File system monitor 210 will get document change information (such as a new document being generated, or an existing document being amended) from an operating system (not shown in the FIGURE), and transfer this information to a crawler 212. The crawler 212 will crawl into the document and then pass it to a parser 214. The parser 214 will parse the document for indexing, including word splitting, filtering, transforming, etc. and then store the result of parsing to a crawled data repository 216.

Typically, an indexer is used for indexing a document for the convenience of searching, and storing it in an indexing database. The normal way to index includes using vector space model, inverted index or probabilistic model, etc. Indexing building component 218 in FIG. 2 retrieves documents from a crawled data repository 216, and sends them firstly to a nature language process component (NLP) 220, which is used for syntactic (e.g. wordbreaking), semantic and pragmatic analysis. The analysis result will be stored in a lexicon 224, for example as a hash table, containing key words list and pointer list used for associating with inverted documents. Indexer 222 is connected with NLP component 220, and is used for building index for a document and storing it in an inverted index repository 226 for the use of searching.

Ranking system 228 is used for computing matching degree(s) between key word(s) and target document(s). All the documents that meet searching requirement can be increasingly/decreasingly ranked according to the relevance degree, and then are sent back to the user. The ranking system 228 in FIG. 2 contains a query parser 230, a sorter 232, and a merger 234. The query parser 230 is user for parsing key word(s), as search query(s), received from a user interface 236, and then conducting search in the lexicon and the inverted index repository. In most cases, current search engines can conduct key words parsing based on the fuzzy searching technology. The sorter 232 is used for ranking the found documents. The merger 234 is used for merging the documents stored in different repositories.

User Interface (UI) 236, in connection with user input/output apparatus (not shown in the FIGURE), is used for receiving searching request(s) from a user. UT 236 is also used for receiving a user-predefined interface for presenting search result(s), and formatting the search result ranked by the ranking system 228 according to the user-predefined UT 100, and finally returning it to the user.

Figure 3A:
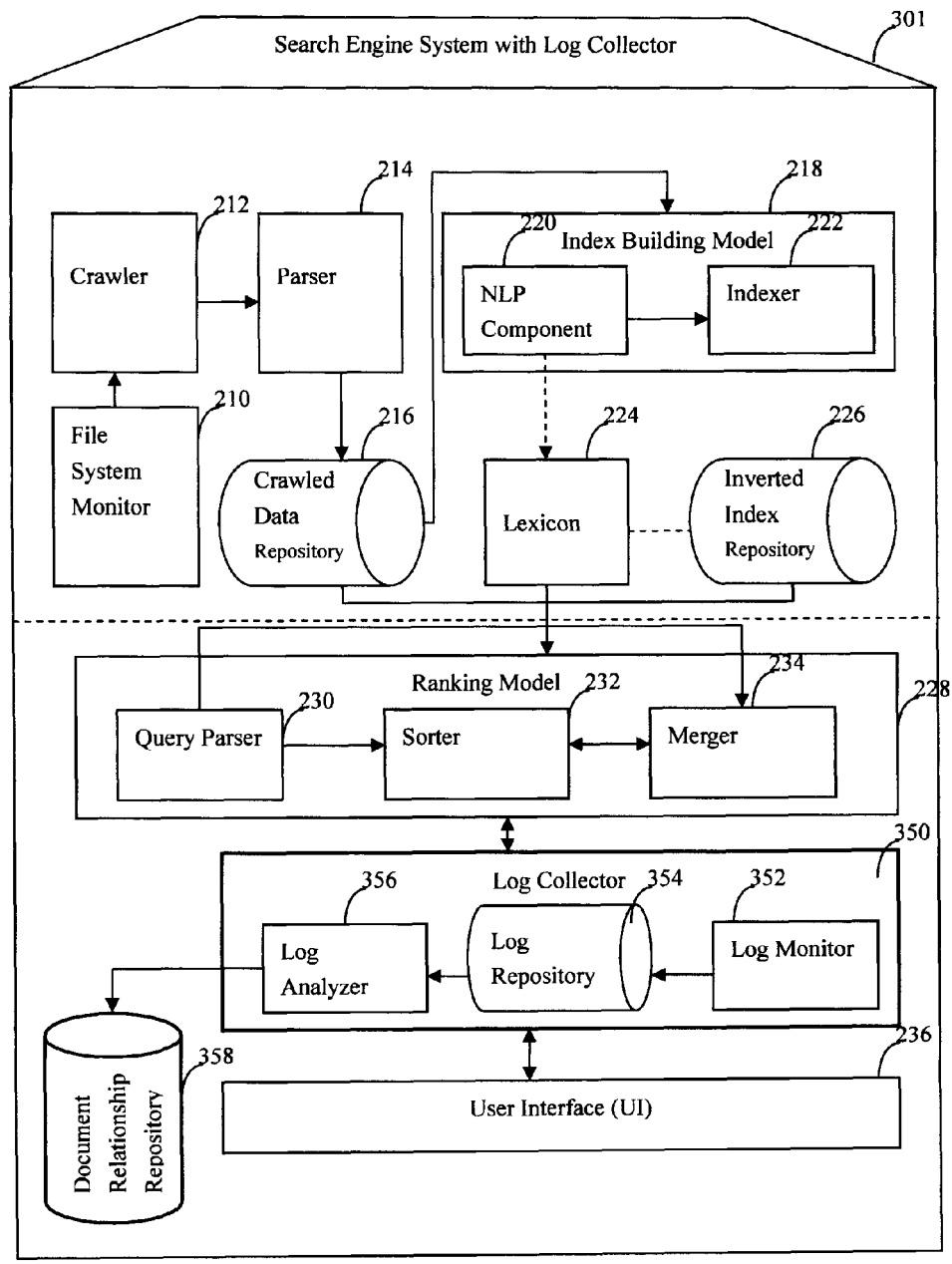
FIG. 3A illustrates a block diagram of a desktop search engine with a log collector.

FIG. 3A is a block diagram of a desktop search engine 301 with a log collector 350. The desktop search engine is a tool specially used for conducting search among local data. Its main difference with other existing search engines is the log collector 350 configured between the ranking system 228 and UI 236. The major function of the log collector 350 is to collect user's operation upon the search result 134, and mining documents relationship from the user's operation. More in detail, the log collector 350 comprises a log monitor 352, a log repository 354, a log analyzer 356, and it is connected with a document relationship repository 358.

After a user submits a search query to a search engine, the search engine will return a ranked document search result list, and then the user will determine whether he needs to further open a document for reading based on the information corresponding to the search result, such as title, summary, etc. Generally speaking, if the user opened a document for reading over a certain period of time (e.g. 5 minutes), it could be deemed that the document has relationship with the search query that the user inputted, which means this document can be deemed as a related document. A more specific and detailed description about how to determine the related document will be provided hereinafter, and below is only an illustrative description. It is appreciated that the "certain period of time", as a reading time threshold, can vary depending on different document types. The reading time threshold for word document and pdf document, for example, may be a little bit longer, because a user normally spends more time on reading those documents and determining the relevance thereof. The reading time threshold for html document or picture document, however, does not need to be very long. The log monitor 352 is useful for monitoring a user's searching action, and a user's click operation upon the search result 134, and then storing corresponding information into Table 1 of the log repository 354.

TABLE 1

Search Result User Operation Recording Table

| Search query | Document Search Result | Related Document | Extra Information |
|---|---|---|---|
| Q1 | Doc 1 | Doc 1 | 7 minutes |
| | Doc 2 | Doc 2 | 6 minutes |
| | Doc 3 | Doc 3 | 5 minutes |
| | ... | None | None |
| | Doc 10 | None | None |
| Q2 | Doc ... | Doc ... | ... |
| ... | | | |
| Qn | Doc ... | Doc ... | ... |

In Table 1, "document search result" list contains ten documents, as a search result 134, obtained with a same search query. "Related document" list stores the documents that have established relationship with each other due to user's operation upon search result, such as a list illustrating documents opened/read by the user over a reasonable period of time (e.g. 5 min.). "Extra information" section contains extra information corresponding to user's action of opening/reading the related document, such as the time period for reading a document, the number of times of reading one document, and the time or sequence of clicking a document, etc. It should be noted that the line of information indexed by the search query Q1 can mean either user's clicking operation after one searching action, or separate clicking operations after different searching actions conducted in different time with the same search query. For example, the user inputs the same search query twice to conduct the same search, and during those two times of searching actions, the user opens different documents for reading.

In addition, it could be appreciated that, Table 1 may not store "document search result" list, because the information stored in search result 134 becomes unimportant to subsequent operations any more, after the "related document" list is generated. Furthermore, Table 1 may also not store "extra information"; because the "extra information" is used for computing the relevance degree in subsequent steps. In the case that performing any detailed computation about the relevance degree is not required and it can be roughly considered that all the documents clicked/read by a user over a reasonable period of time refer to the same relevance degree; the "extra information" list could be simply disregarded.

When many cases are considered, the "extra information" in Table 1 can be adequately expanded to contain the number of times that one document is opened by the user, the time/ opening sequence when the selected document is opened, etc. Generally, when a document, as one of a search result 134, is repeatedly opened for reading by a user, it could be deemed as having strong relationship with the search query; or in another case, it could be deemed that one/a few document(s), which is firstly opened by a user, have strong relationship with the search query; certainly, in another circumstance, it could also be deemed that one/a few document(s), which are finally opened by a user, have strong relationship with the search query. In conclusion, the "extra information" here may comprise any information that is related to user' operation upon search result, and can be used for computing the relevance degree in subsequent steps.

Log analyzer 356 will analyze the information obtained from Table 1 of the log repository 354, work out the relevance degree between documents, and store it into Table 2 of the document relationship repository 358. For all the related documents indexed by each search query in Table 1, a relationship between each pair of documents is established in Table 2 in terms of the search query(s) and the relevance degree.

TABLE 2

Documents Relationship Table

| Related Document | Doc 1 | | | Doc 2 | | | ... | Doc n |
|---|---|---|---|---|---|---|---|---|
| Doc 1 | | 0 | | Q1 | 100% | 90% | | ... |
| | | | | Q2 | 80% | | | |
| Doc 2 | Q1 | 100% | 90% | | 0 | | | ... |
| | Q2 | 80% | | | | | | |
| ... | | | | | | | | ... |
| Doc n | | ... | | | ... | | ... | 0 |

The line data and column data in Table 2 represent the related documents extracted from Table 1, and a point of intersection between two axes represents relationship data between a pair of documents. The relationship data contains the search query in conjunction with the line document and column document in Table 2, as well as the relevance degree between them, etc. The relevance degree can be either search query-based relevance degree, or an average relevance degree between documents. The search query-based relevance degree means the relevance degree between two documents in term of one search query; the average relevance degree means the average relevance degree between two documents in term of all search queries. For example, Q1 and Q2 in the Table respectively represent two search queries. 100% represents the relevance degree between Doc 1 and Doc 2 based on user's operation upon Q1 search. 80% represents the relevance degree between Doc 1 and Doc 2 based on user's operation upon Q2 search. 90% means the average degree comprehensively considering the relevance computed in term of two different queries. In this embodiment, 90%=(100%+80%)/2.

The query-based relevance degree is computed according to such assumption: when each one of two documents has a strong relationship with a search query, the same strong relationship exists between those two documents; on the contrary, when only one of two documents has a strong relationship with the search query, or neither of the two documents has a strong relationship with the search query, it can not be concluded that there is the same strong relationship between those two documents by then. Therefore, the relevance degree mentioned here depends mainly on the "extra information" illustrated in Table 1.

The average relevance degree between documents is obtained by combining each of query-based relevance degree mentioned above. Certainly, the average degree can be obtained by a weighted average computation as the following:

Average relevance degree=($Q1$ based relevance degree*Weight 1+$Q2$ based relevance degree*Weight 2+ . . . +$Q_N$ based relevance degree*Weight $N$)/$N$ The weight corresponding to each query can be determined by any simple/complicated computation; for instance, when a key word (i.e. search query) appears frequently in two documents, it could be understood that this key word is very important and hence its weight is increased.

In order to make the present invention simpler, other embodiments of the invention may be devised, for example, the invention can disregard the relevance degree between documents (no matter the query-based relevance degree or the average relevance degree), and store only the search query pertinent to a pair of documents as shown in Table 2A. Thus, when related documents are presented to the user in subsequent steps, related documents will not be ranked according to the relevance degree. Rather they can be shown randomly.

TABLE 2A

Documents Relationship Table without Storing Any Relevance Degree

| Related Document | Doc 1 | Doc 2 | . . . | Doc n |
|---|---|---|---|---|
| Doc 1 | 0 | Q1, Q2 | | . . . |
| Doc 2 | Q1, Q2 | 0 | | . . . |
| . . . | | | | . . . |
| Doc n | . . . | . . . | . . . | 0 |

TABLE 2B

Documents Relationship Table without Storing Any Search Query

| Related Document | Doc 1 | Doc 2 | . . . | Doc n |
|---|---|---|---|---|
| Doc 1 | 0 | 90% | | . . . |
| Doc 2 | 90% | 0 | | . . . |
| . . . | | | | . . . |
| Doc n | . . . | . . . | . . . | 0 |

It could also be appreciated that, even the search query and the query-based relevance degree can both be omitted in Table 2 (i.e. only maintaining the average relevance degree between documents), as shown on following Table 2B. Thus, when presenting documents relationship in subsequent steps, only the related document per se, rather than the search query, is shown.

Moreover, the average relevance degree in Table 2 can also be omitted. In such a case, when presenting documents relationship in subsequent steps, the related documents will not be ranked according to the average relevance degree.

In a more complicated embodiment, items stored in Table 2 can be further supplemented. For example, a relevance degree between a document and a corresponding search query can also be stored in Table 2. The relevance degree can be computed in any way that a person skilled in the art can understand, and hence which is omitted here. At the same time, the search engine system can also perform other operations on Table 2 as needed, such as add/delete items from the Table for reducing memory space, or rank the items stored therein for the convenience of subsequent process.

In conclusion, the goal of Table 2 is to transform the relationship-description from "search query to document" that is represented in Table 1 to "document to document", and build documents relationship accordingly.

Figure 4A:
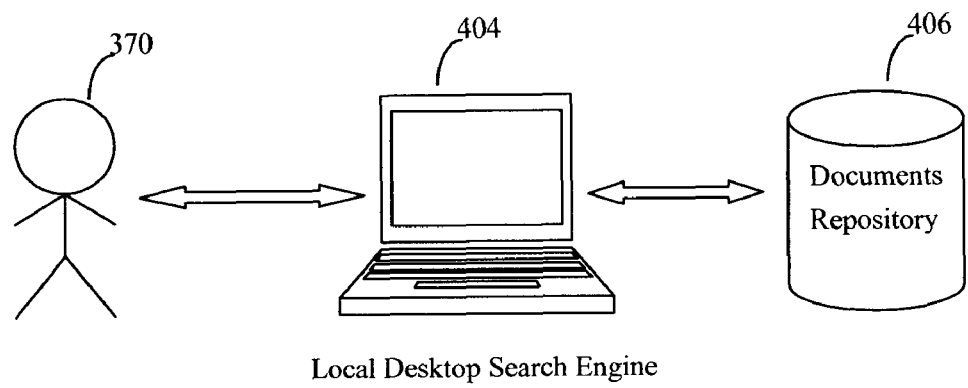
FIG. 4A illustrates a simple diagram of a desktop search engine for building documents relationship.
Figure 4B:
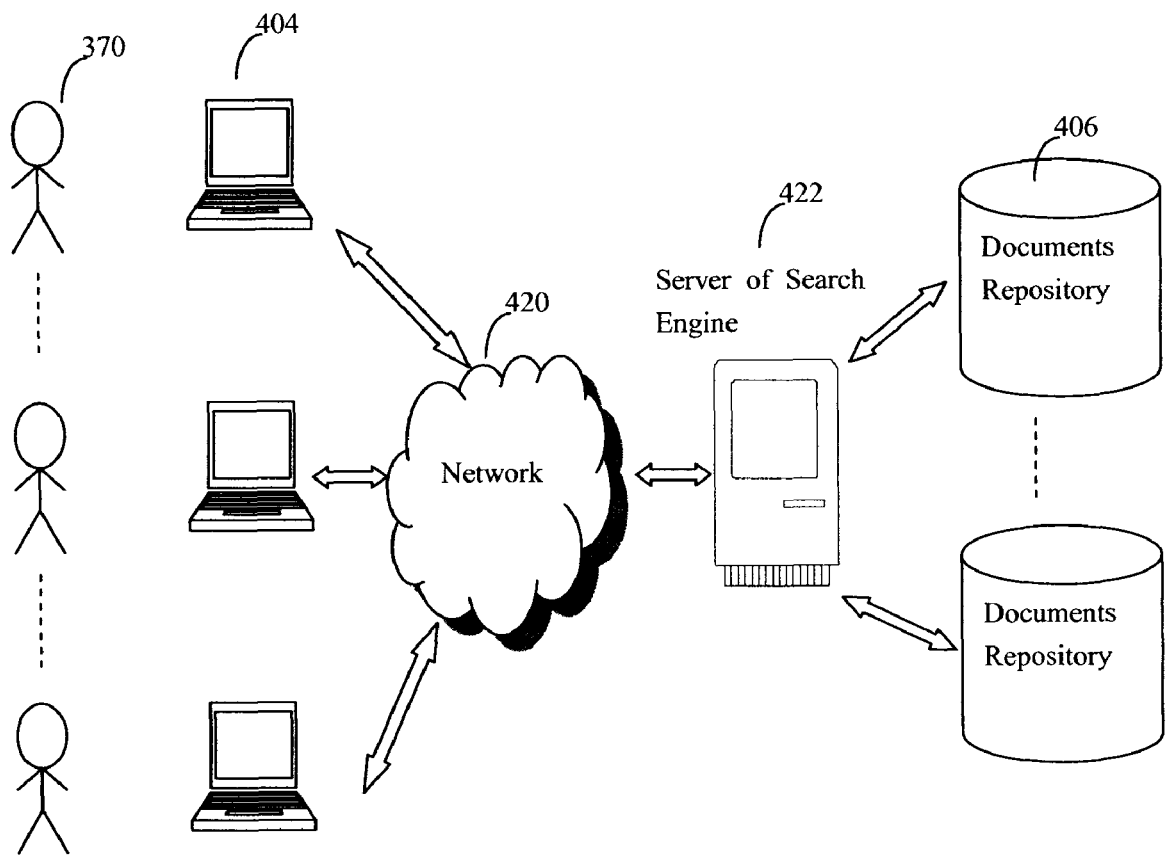
FIG. 4B illustrates a simple diagram of a network search engine for building documents relationship.

FIG. 3A illustrates a block diagram of a desktop search engine, but the present invention is not limited to the desktop search engine such as desktop search engine 404 shown in FIG. 4A operated by a user 370 to work with documents repository 406. On the contrary, the present invention can also be applied to a network search engine illustrated in FIG. 4B. The network search engine 422 means the search system where a user 370 can connect with a server 422 by a network 420, and the search engine is configured on the server.

Figure 3B:
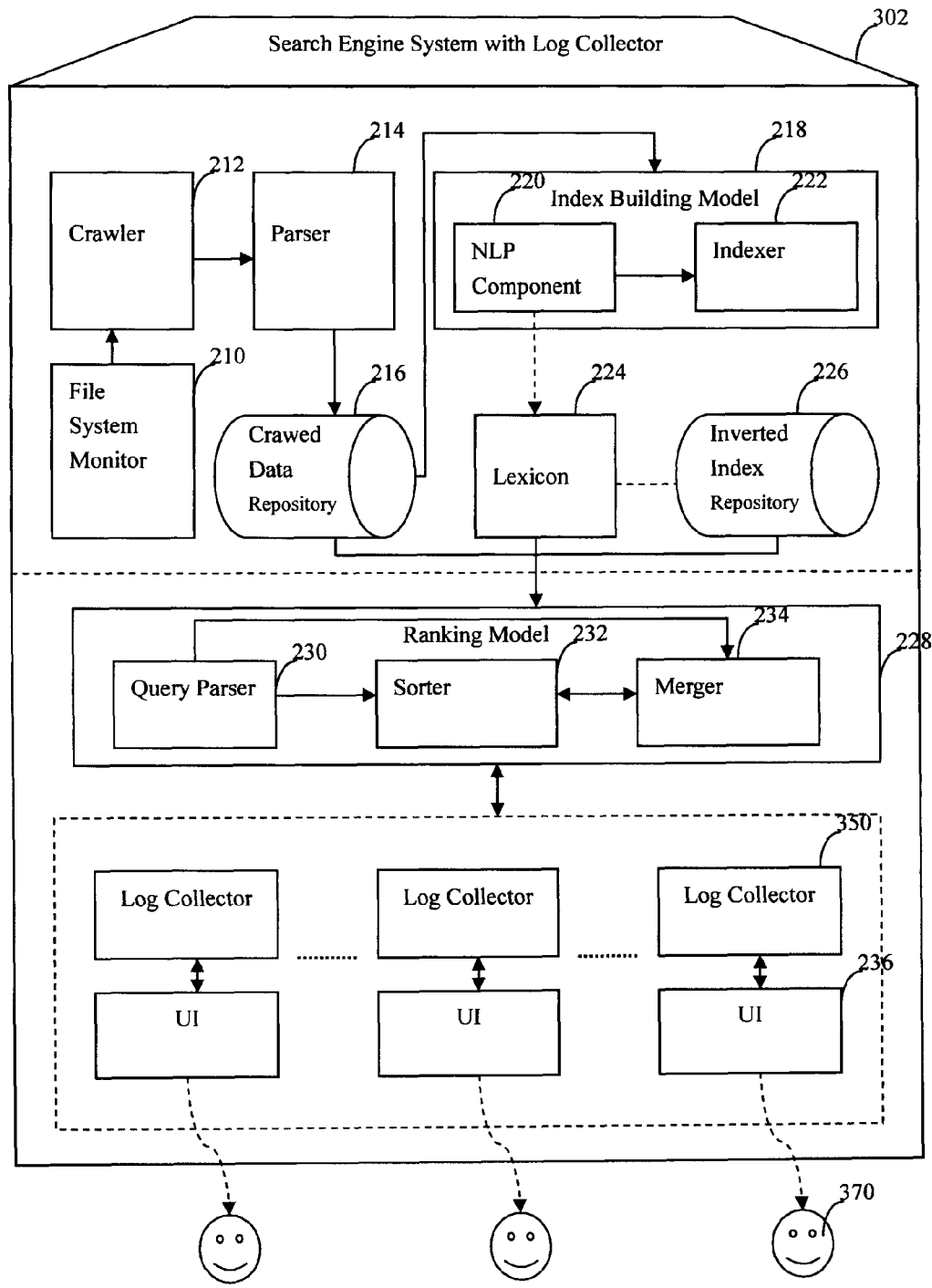
FIG. 3B illustrates a block diagram of a network search engine that builds different log collectors for different individual users.

FIG. 3B is a block diagram of a network search engine 302 that builds different log collectors 350 for different individual users 370. In this diagram, the server builds separate log collector 350 for each user 370, and configures a document relationship repository 358 (not shown in the FIGURE) for each user 370 in terms of his search history. Therefore, the server can provide service for users 370, allowing users 370 to check related documents that have relationship with a certain document in the server. Just because the server builds a special log collector 350 for each user 370, the present embodiment can ensure a fully personalized result.

Figure 3C:
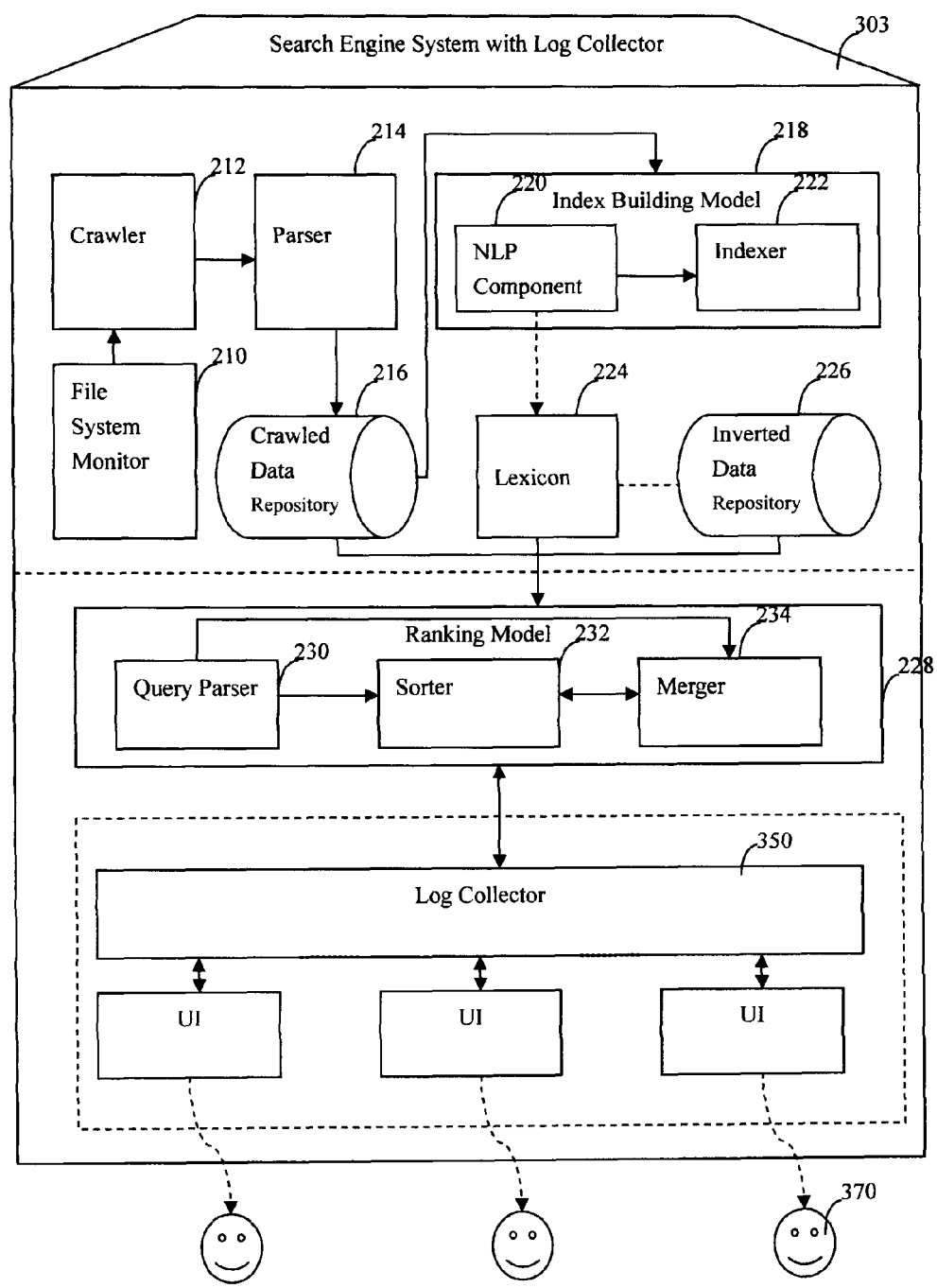
FIG. 3C illustrates a block diagram of a network search engine that builds the same log collector for different users.

FIG. 3C is a block diagram of a network search engine 303 that builds a common log collector 350 for different users 370. The server in this system builds a common log collector 350 for multiple users 370, and configures a shared document relationship repository 358 (not shown in the FIGURE) for the multiple users 370. In the present embodiment, various users 370 could be deemed as a single one without any differentiation. The advantage is: any user's operation upon a search result can lead to an update of the documents relationship, which can therefore ultimately approach a real state of documents relationship. Consequently, each user 370, who will visit the server later, can refer to documents relationships in terms of other users' search histories/activities.

Figure 5:
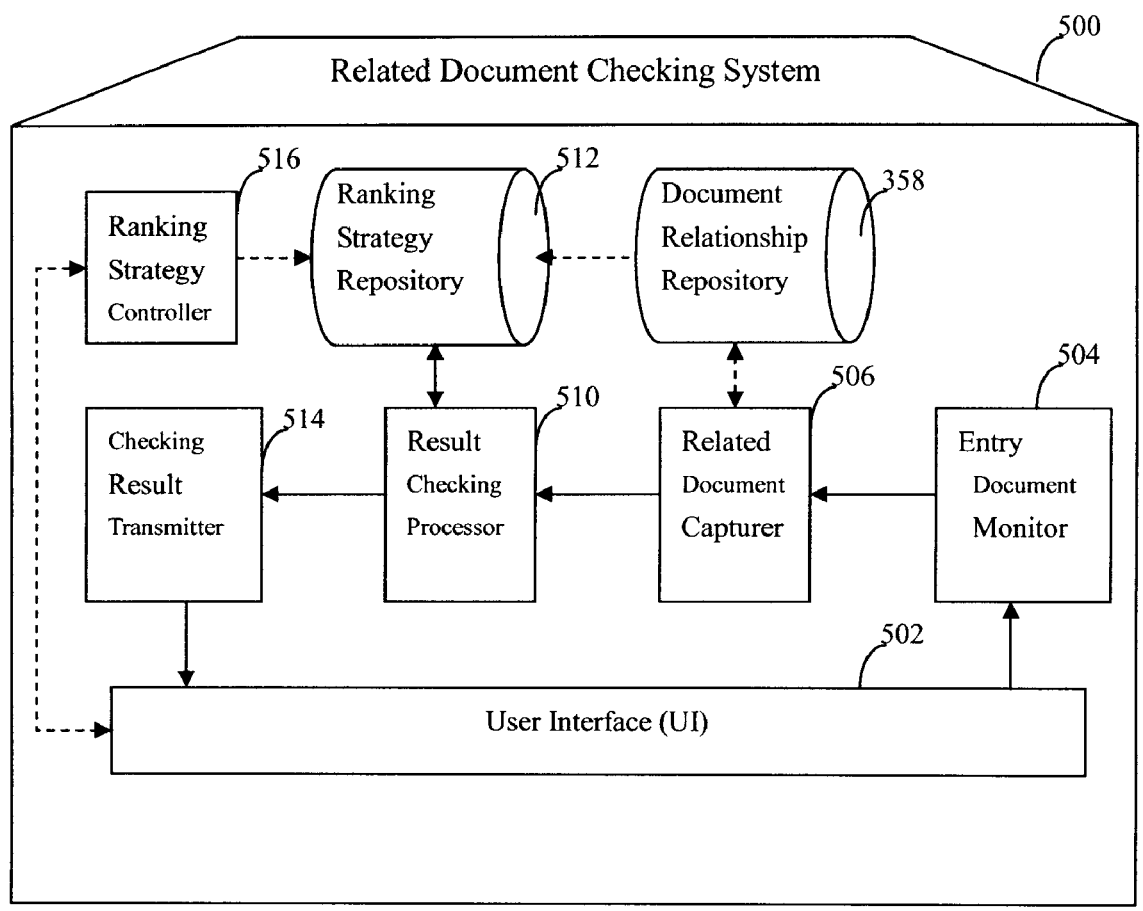
FIG. 5 illustrates a block diagram of a related document checking system.

FIG. 5 is a block diagram of a related document checking system 500. When documents relationship table (Table 2) in the document relationship repository 358 hereinabove is ready, the related document checking system 500 can provide related documents checking service for users. That is when a user inputs a document as an "entry document", the related document checking system can work out related document(s) which have relationship with the entry document, and then send the related document(s), as a checking result, back to users. A document selected by a user for the aim of checking is received by a user interface 502, and then is transferred to an entry document monitor 504, wherein the "entry document" means the document selected by the user as an entry for checking other related documents which have relationship with this entry document; the entry document monitor 504 is responsible for monitoring an entry document that is inputted by the user; then a related document capturer 506 will obtain other documents related to the entry document from the document relationship repository 358; a result checking processor 510 processes the related documents obtained from the related document capturer 506, i.e. sorts out qualified related documents and ranks the related documents; a ranking strategy repository 512 stores a default ranking strategy of checking results, or a user-predefined ranking strategy obtained from the user interface 502 by using a ranking strategy controller 516; finally the related documents after sorting and ranking will be sent back to the user interface 502 by a checking result transmitter 514.

Processes used in the present invention will be discussed below.

Figure 6A:
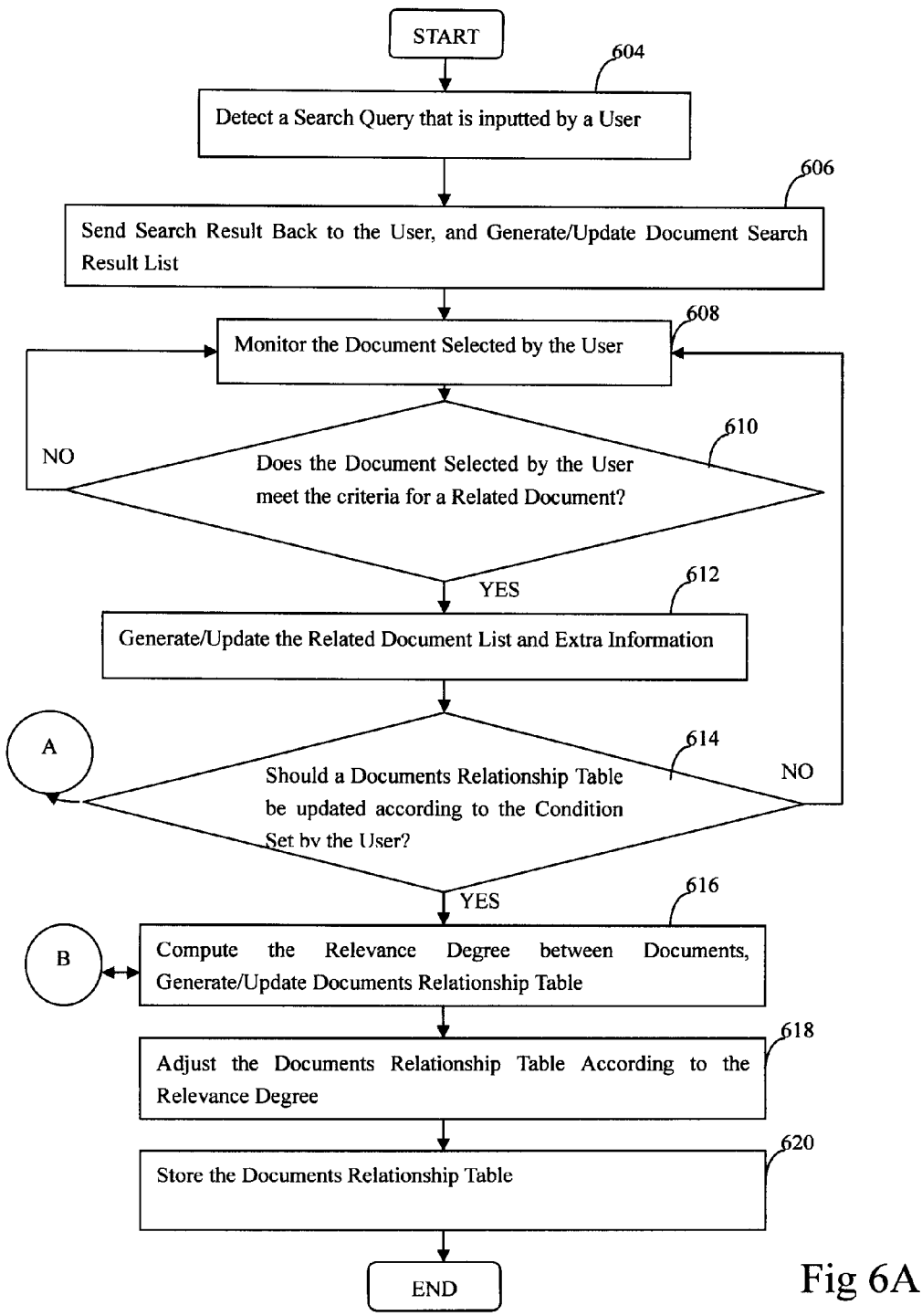
FIG. 6A illustrates a flow chart establishing documents relationship based on user's operation upon search result.

FIG. 6A is a flow chart establishing documents relationship based on user's operation upon search result. Firstly, when a search query inputted by a user is detected in step 604, the search engine will return a search result to the user in step 606, and generate/update a document search result list.

Next, the system will monitor a user selected document within the search result in step 608, and determine whether the selected document meets the criteria for related document in step 610. Generally, the user can select a document by an operation of clicking, and it is appreciated by the person skilled in the art that, the user can also select a document by other operations, including "save as", keyboard shortcuts, etc. The search engine may have further criteria to determine a related document; normally, the document that is opened by a user over a certain period of time may be considered as a qualified related document; in a simpler embodiment, the step of determining a related document can also be omitted, i.e. so long as a document is opened by a user, it can be deemed as a related document, no matter how long it is read by the user; in other cases, the number of times that one same document is opened by the user, and the time or sequence when a document is opened for reading can also be considered separately or together in determining the criteria for related document.

In step 612, if the user selected document is determined to meet the criteria for a related document, the search engine system will generate/update the related document list and extra information in Table 1. Table 1 is completed by then.

Figure 6B:
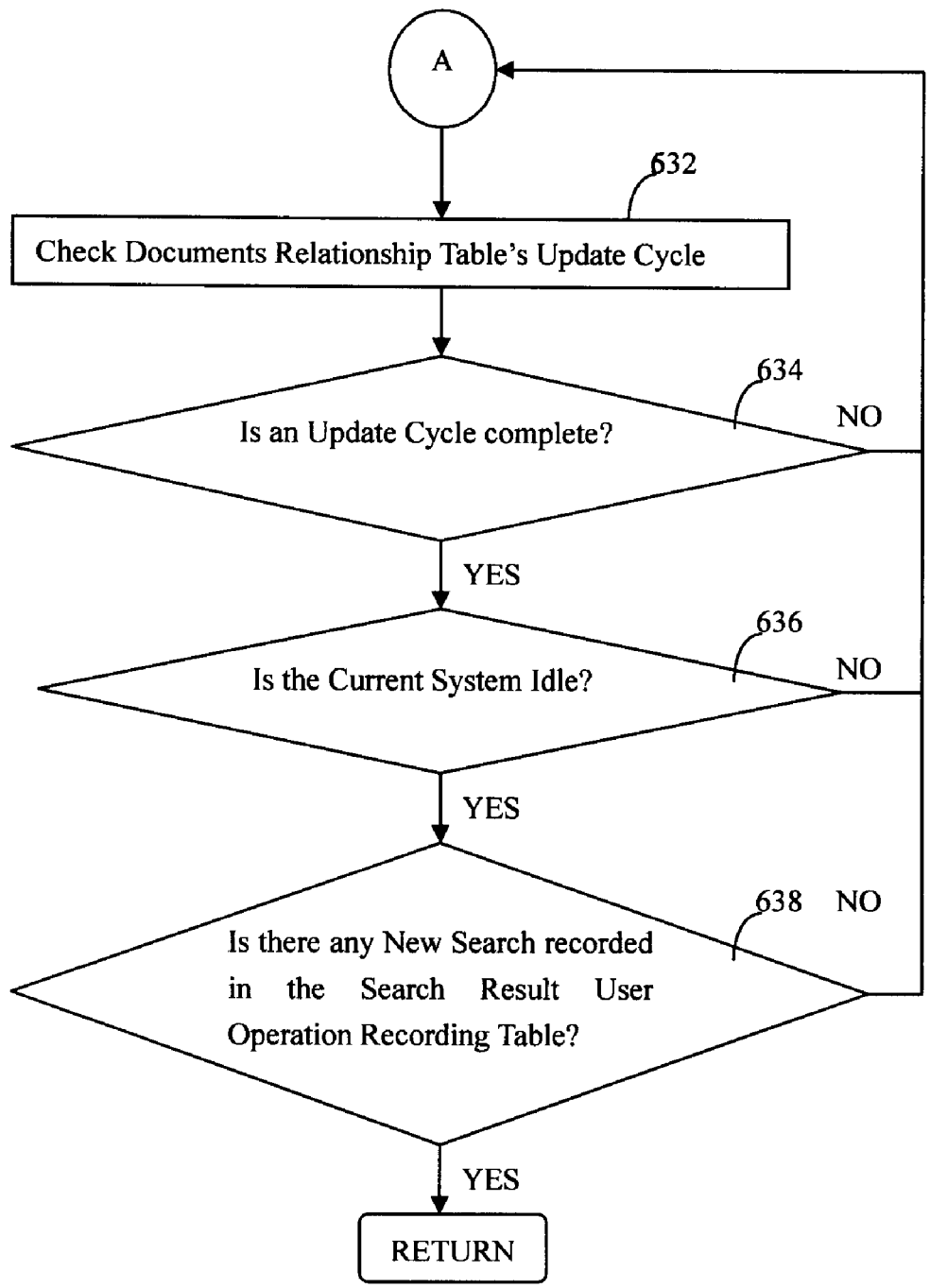
FIG. 6B illustrates a flow chart determining whether it's needed to update documents relationship table.

Although theoretically it can be true, in practice, it is unnecessary to analyze/adjust contents in Table 1 immediately for generating/updating Table 2, because analyzing/adjusting steps can be done either in system idle time or periodically for the purpose of reducing the system's overhead. Therefore, it is determined in step 614 whether Table 2 will be updated according to conditions set by a user. FIG. 6B is a flow chart with regards to such process. In step 632, the system checks documents relationship table's update cycle, which can be one day, one week or one month, etc. depending on the system's configuration and the user's requirement. In step 634, the system determines whether an update cycle is complete. If yes, then in step 636 the system further determines whether it is idle at that time. If it is idle, and a new search has been recorded in Table 1 (step 638), then Table 2 could be generated/updated by then.

Returning to FIG. 6A, the system will record documents relationship according to the related document list, and/or the extra information in Table 1.

Figure 6C:
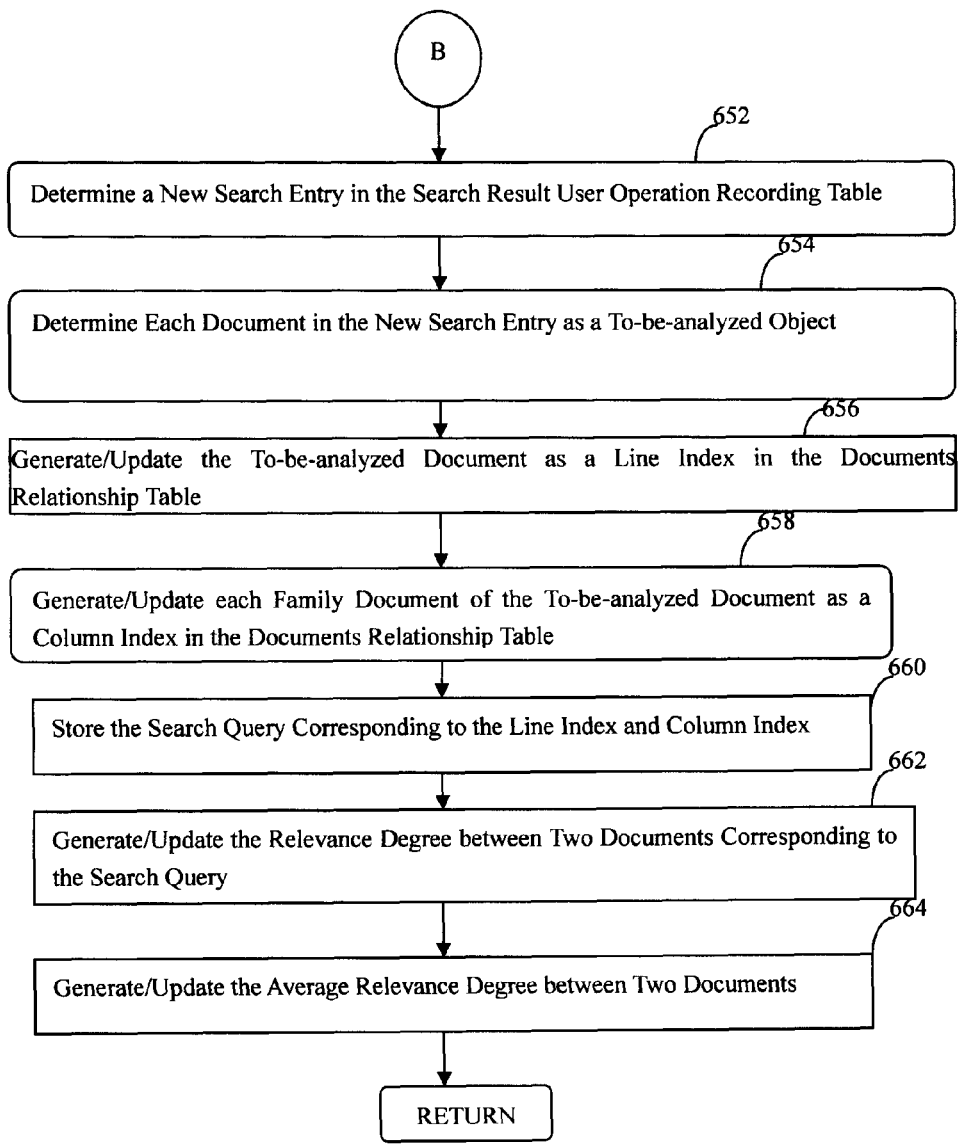
FIG. 6C illustrates a flow chart generating/updating documents relationship table.

In step 616, the system computes the relevance degree between documents, and generates/updates Table 2. FIG. 6C is a flow chart generating/updating documents relationship table. In step 652, the system determines each new search entry in Table 1, and determines each document in the related document list of this new entry as an object to-be-analyzed (step 654); builds a line in Table 2 indexed by the to-be-analyzed object (step 656); and sets related documents of the to-be-analyzed document as column index to build one or more columns in Table 2 (step 658); afterwards, stores the search query corresponding to the line indexes and column indexes (step 660); generates/updates the relevance degree between line document and column document corresponding to the search query (step 662); in the end, generates/updates the average relevance degree between documents (664).

Returning to FIG. 6A, in a preferred embodiment, the system can further adjust Table 2 in step 618, such as adding/deleting items within Table 2 to the extent that the documents relationship is recorded only when the relevance degree exceeds a certain threshold. The adjusted Table 2 is stored in step 620. Thus relationship-description from document to document is established.

The checking process of related document will be discussed below.

Figure 7A:
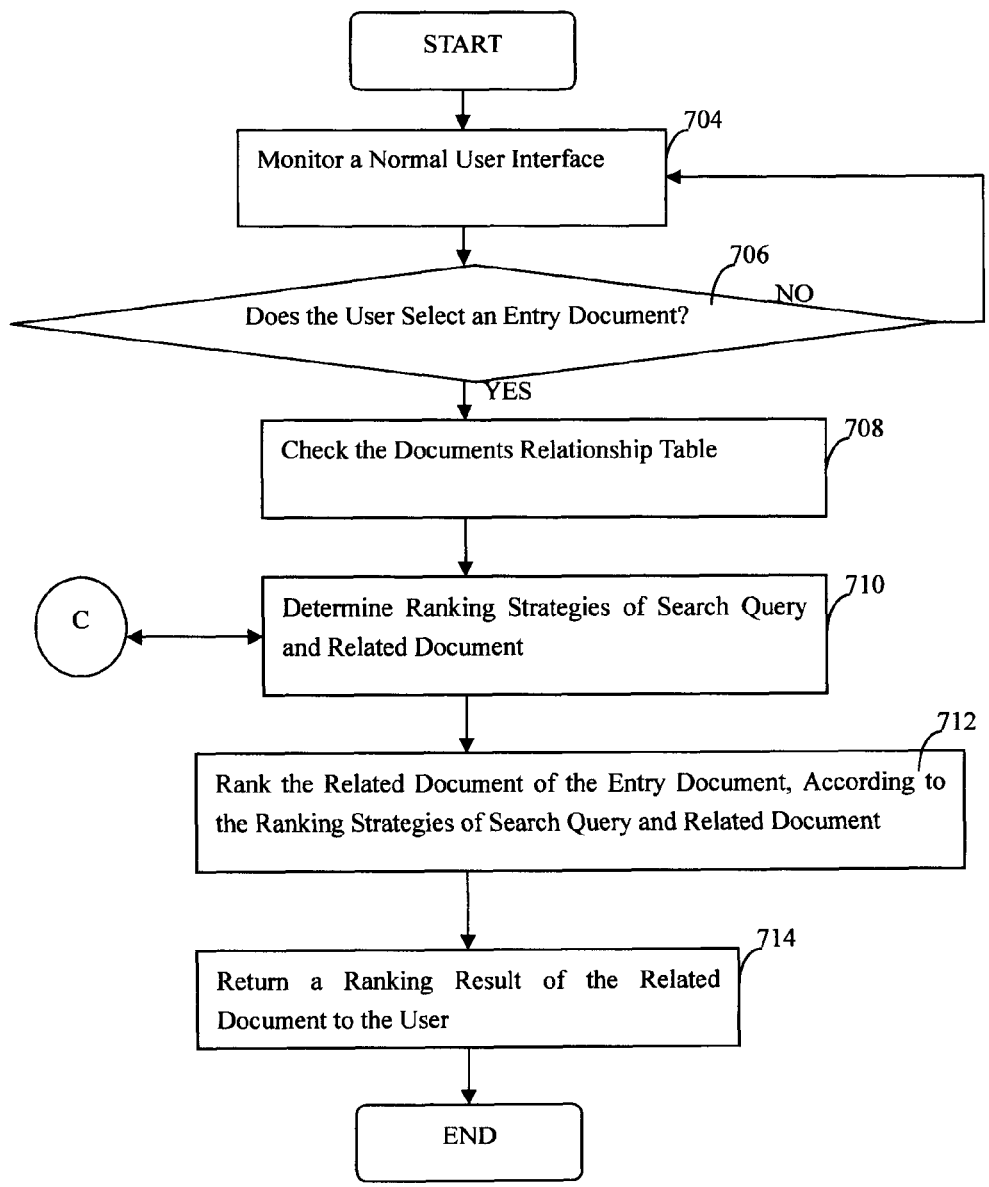
FIG. 7A illustrates a flow chart checking related document(s) of an entry document based on documents relationship that has been established.
Figure 9A:
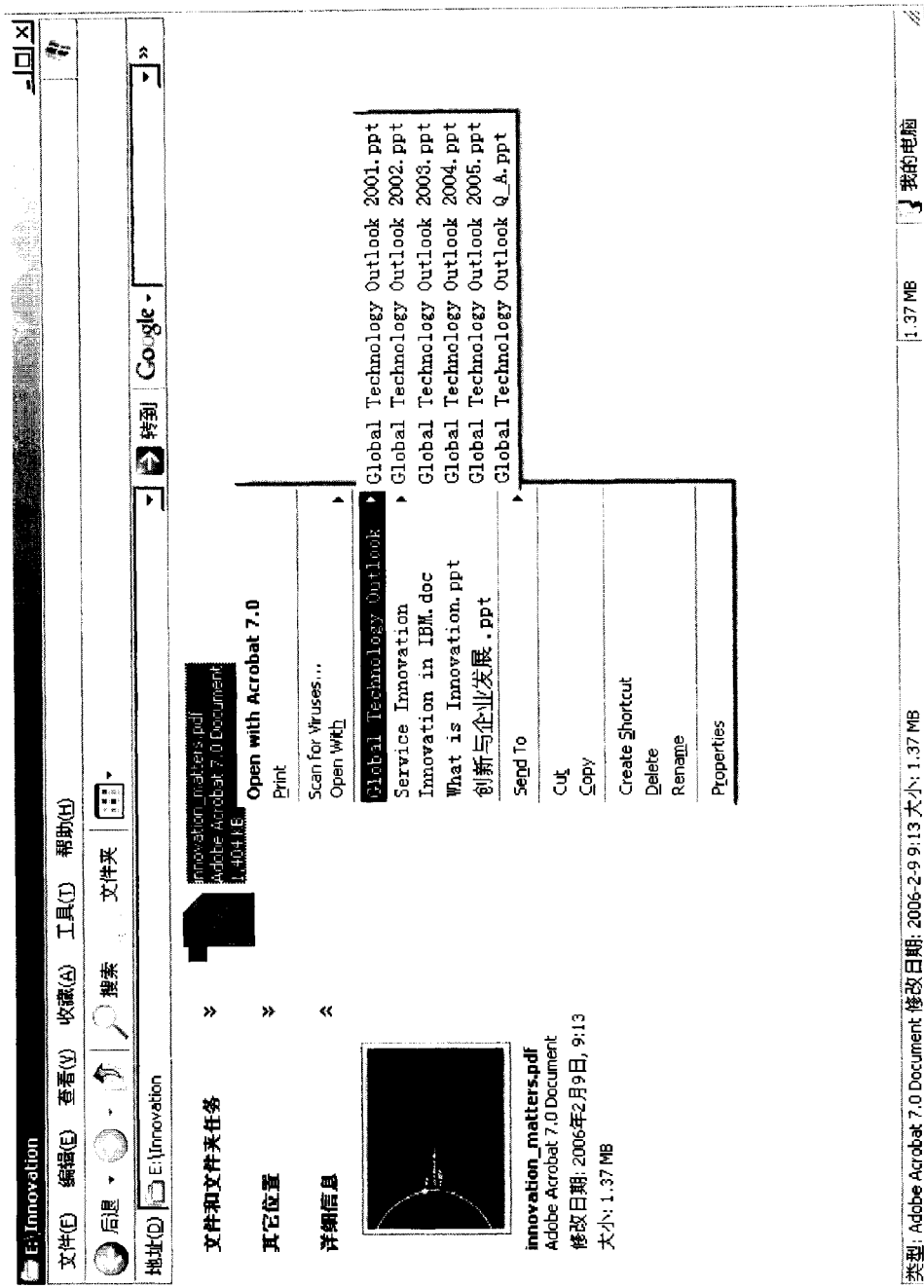
Figure 9B:
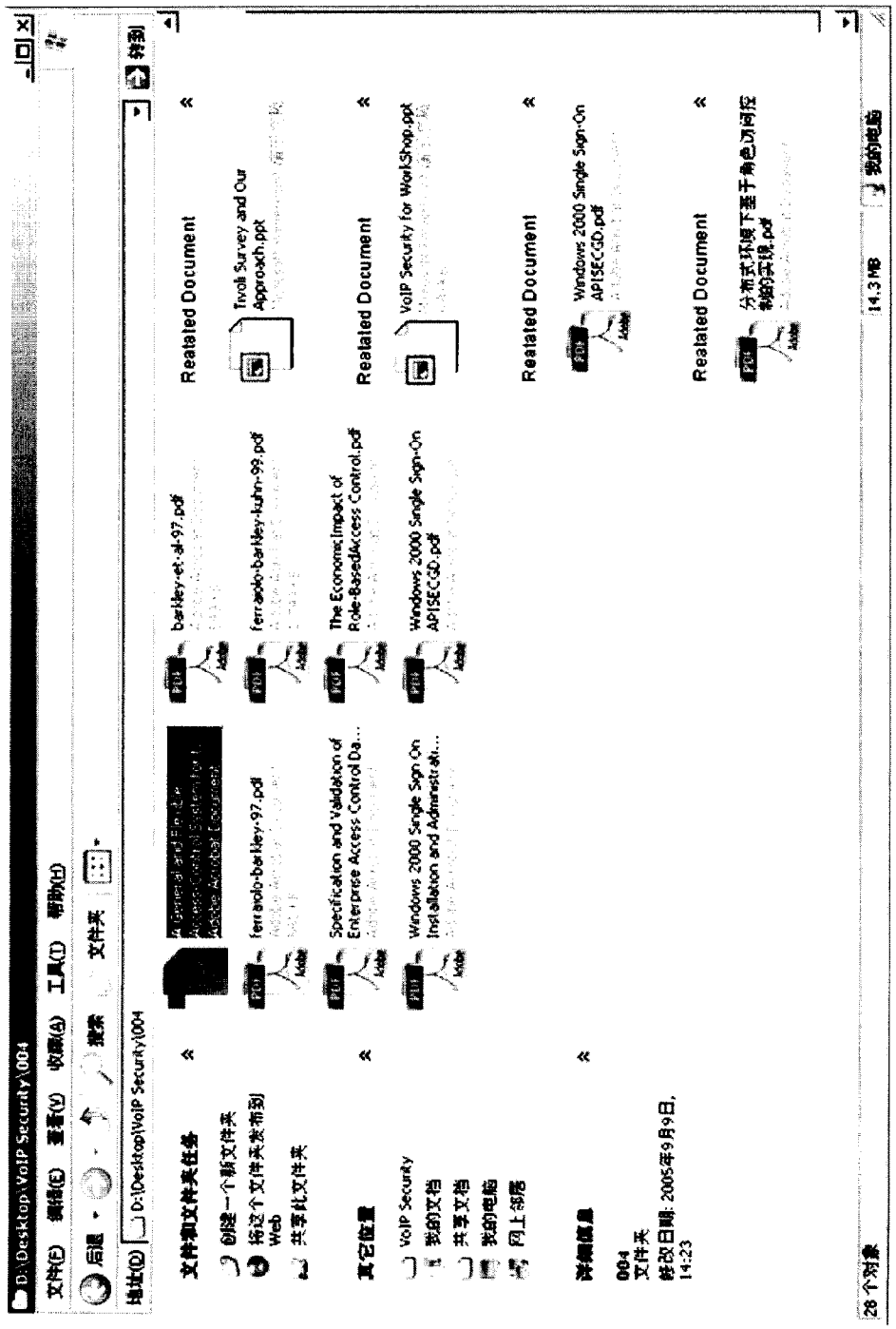
Figure 9C:
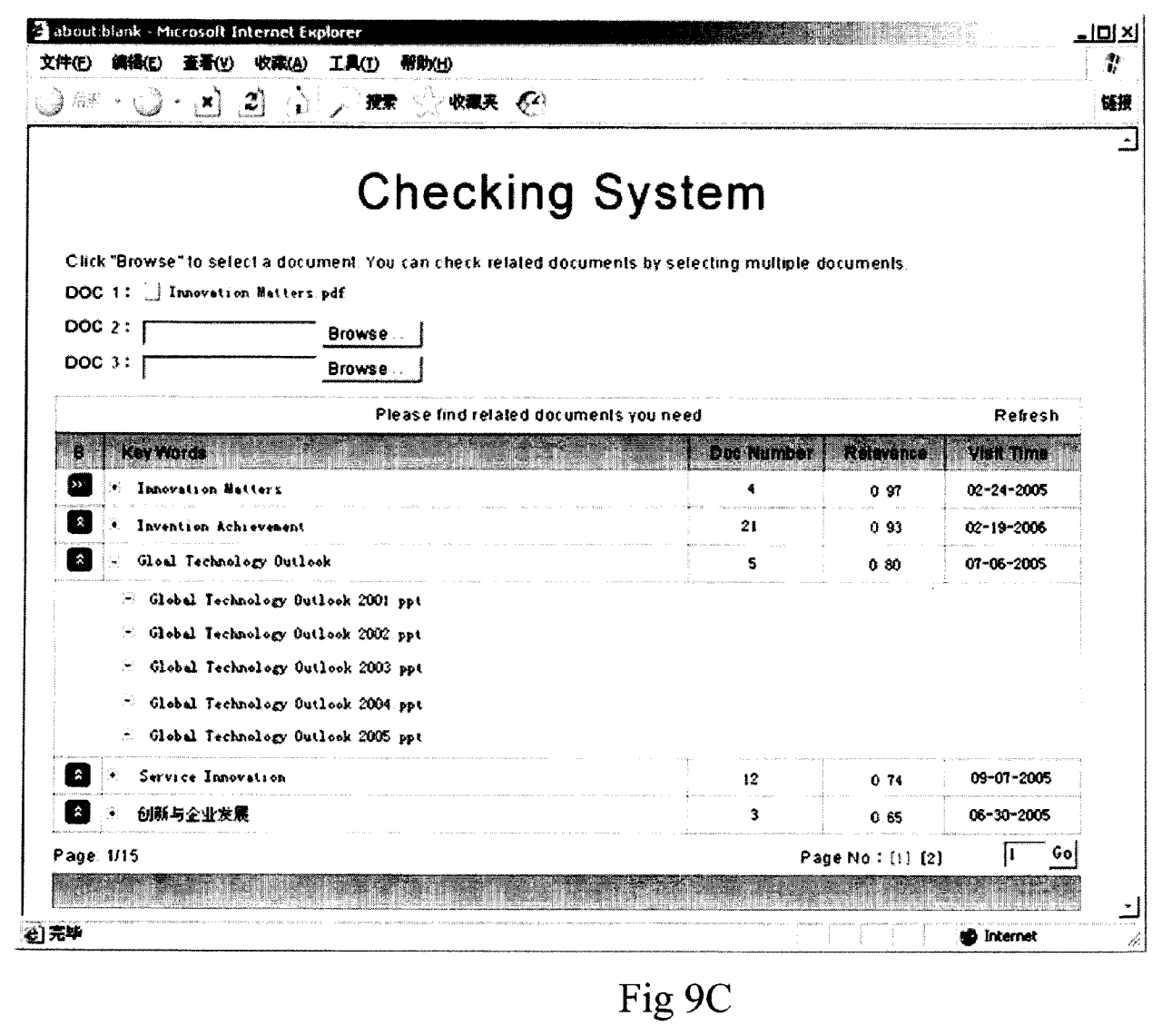
Figure 9D:
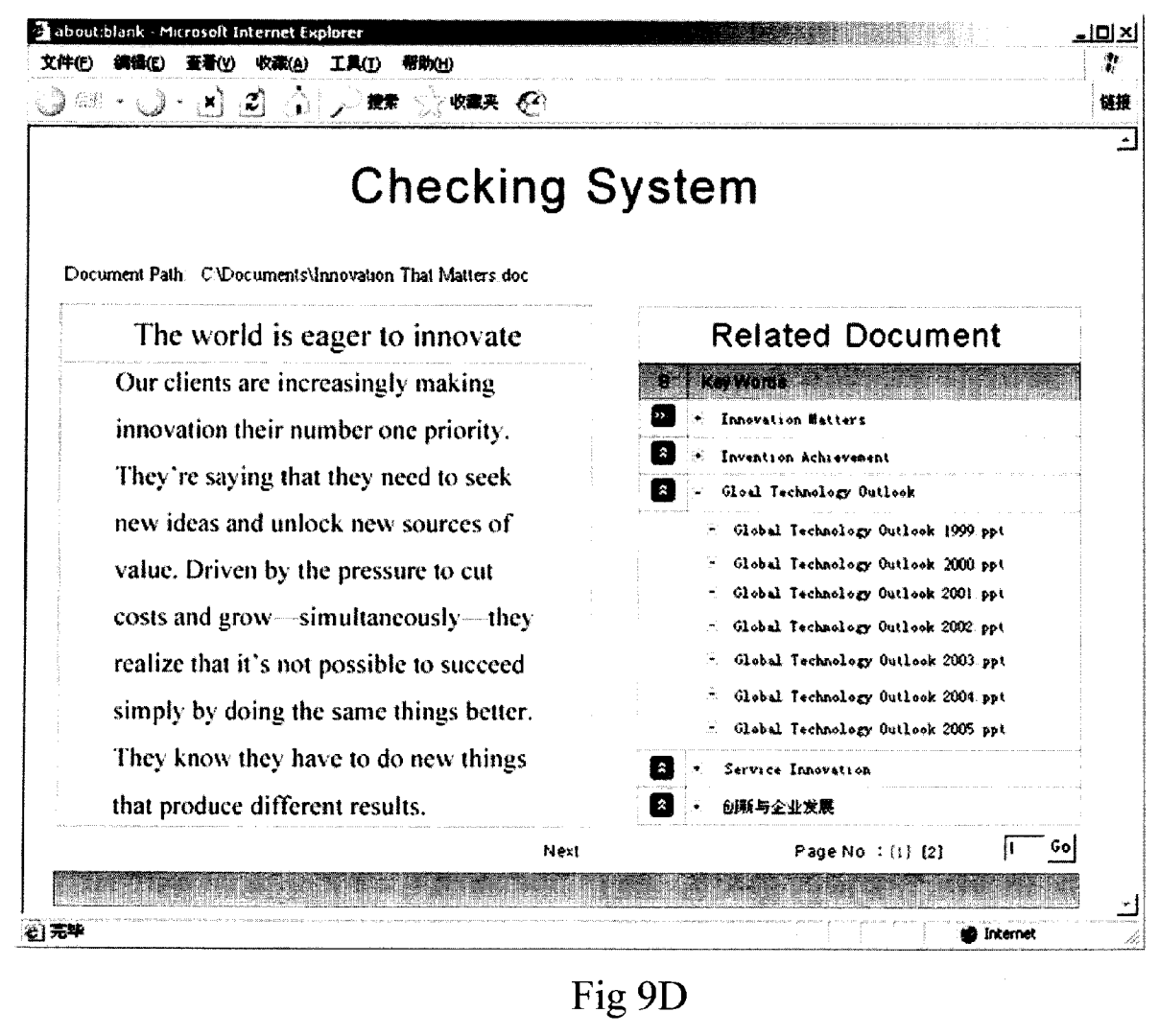

FIG. 7A is a flow chart checking related document(s) of an entry document based on documents relationship that has been established. Firstly, the system is prepared for receiving an entry document from the user for relationship checking. In step 704, the system monitors a user interface, and determines whether an entry document is selected by the user (step 706). It is appreciated by the person skilled in the art that determining a user selected entry document can be conducted in a number of ways. For example, FIG. 9A provides an approach to select a document "Innovation_matters.pdf" by right-clicking it; FIG. 9B provides an approach to select a document "A General and Flexible Access Control Apparatus . . ." by clicking it; or an approach is shown in FIG. 9C in which the user selects a document by inputting the name thereof; in FIG. 9D the user selects a document by double-clicking an icon or link of a document, to expand it for checking related document(s).

When receiving an entry document selected by a user, the system will check related document(s) that have relationship with the entry document. More in detail, in step 708, the system checks the line index in Table 2, retrieves a column data and documents relationship data corresponding to the line.

Preferably, the system can rank search query(s) and related document(s) prior to returning the checking result to the user. In step 710, the system determines a ranking strategy to be conducted. In general, there are at least three types of ranking strategies, 1) ranking the search query(s) corresponding to the entry document first, and then ranking the related document(s) according to each above search query afterwards (the ranking result is referred to FIG. 10A); 2) ranking the related document(s) corresponding to the entry document first, and then ranking the search query(s) according to each above related document afterwards (the ranking result is referred to FIG. 10B); 3) merely ranking the related document(s) as a whole without ranking the search query(s) (the ranking result is referred to FIG. 10C). Above three types of ranking strategies can be applied to each interface in FIG. 9A-9D, and these ranking strategies can be used independently or jointly. FIG. 9A, for example comprises ranking strategies both based on search query(s) first and based on related document(s).

Figure 7B:
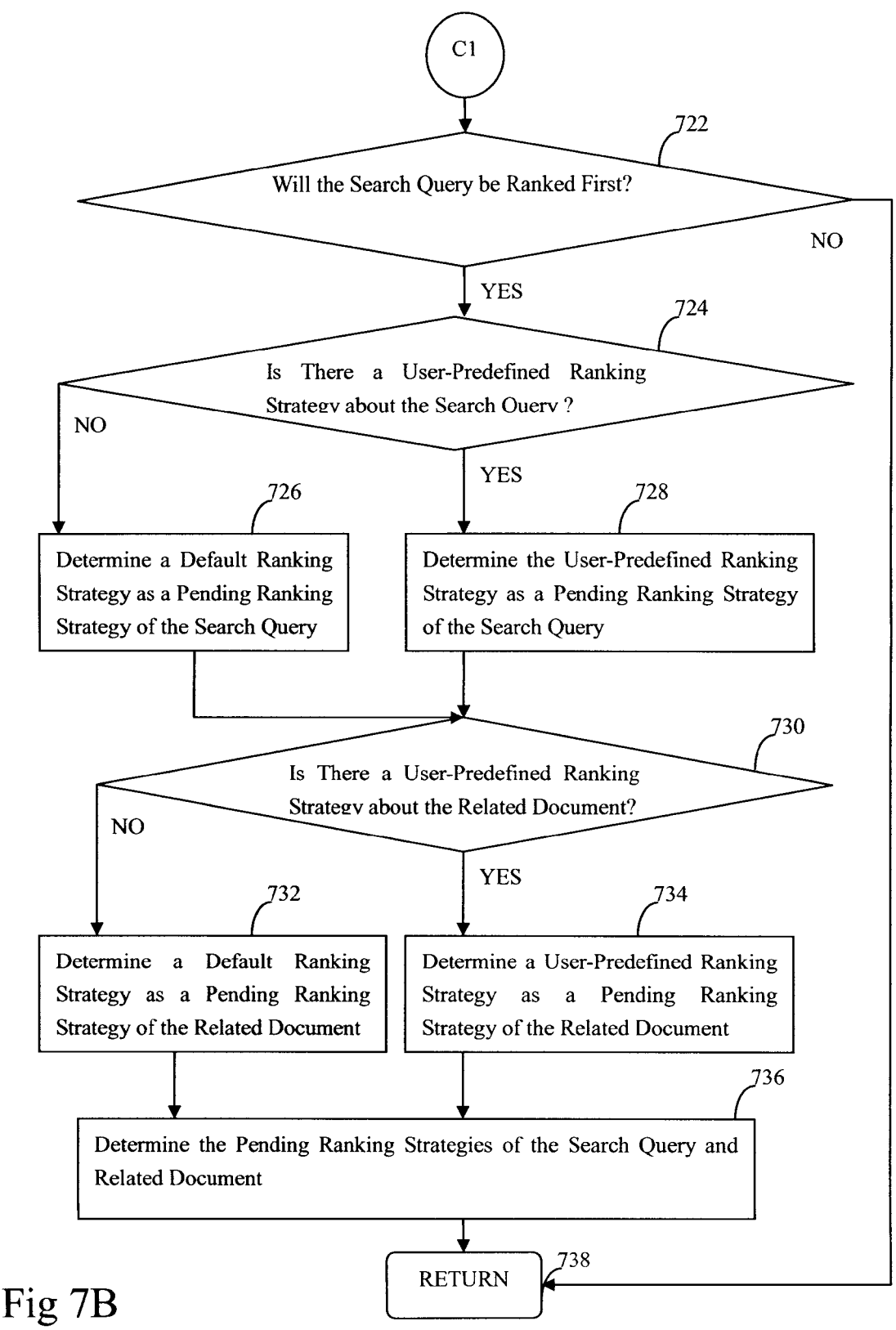
FIG. 7B illustrates a flow chart firstly determining a ranking strategy for search query(s), and secondly determining a ranking strategy for related document(s) that are indexed by the search query(s)
Figure 10A:
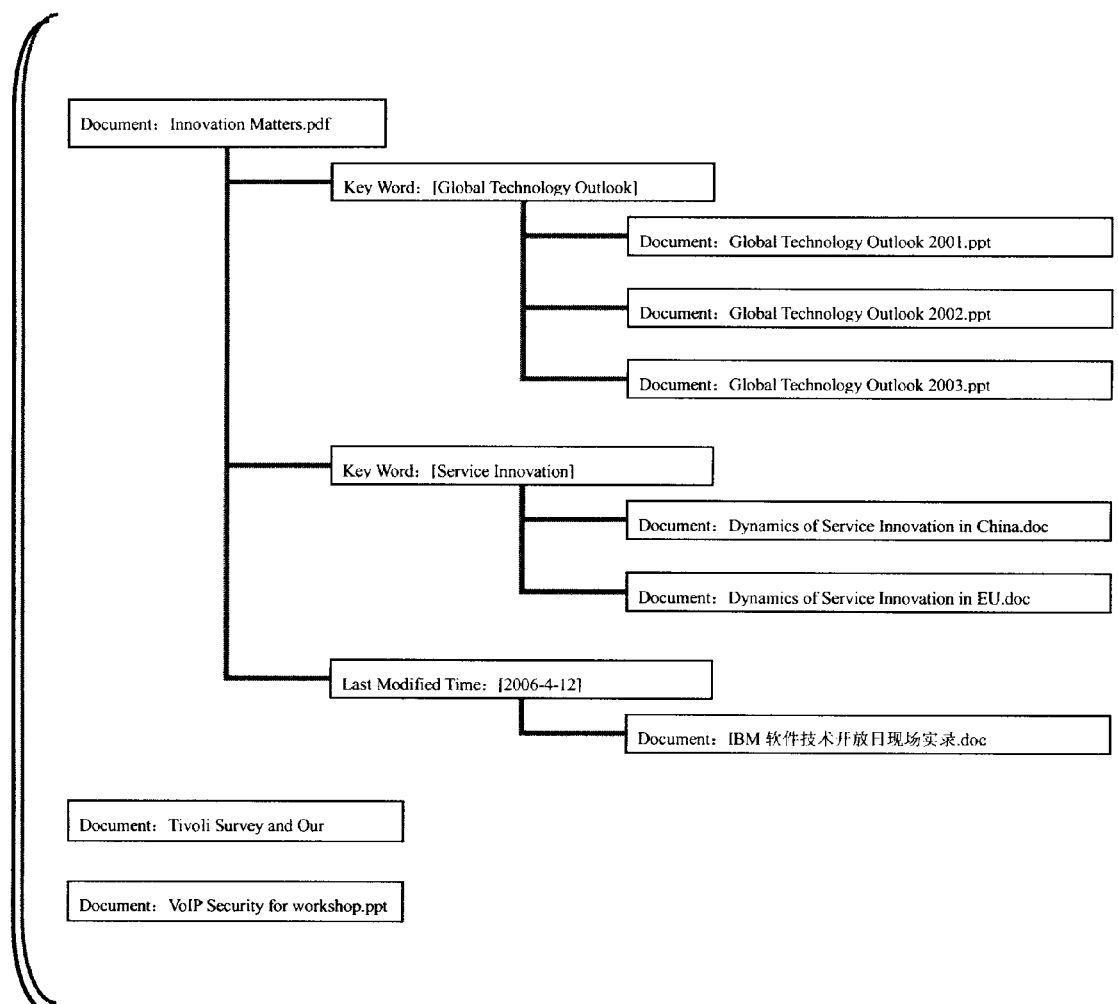
FIGS. 10A-10C are diagrams illustrating tree-based checking result of related document(s).

Corresponding to the three ranking strategies hereinabove, FIG. 7B provides a flow chart corresponding to FIG. 10A. In step 722, the system decides whether it is needed to rank search query(s) first. Then, the system determines whether there is a user-predefined ranking strategy about search query(s) (step 724). If Yes, the user-predefined ranking strategy will be determined as a pending ranking strategy (step 728), otherwise a default ranking strategy will be adopted (step 726). Next, the system determines whether there is a user-predefined ranking strategy about related document(s) corresponding to each search query (step 730). If yes, that strategy will be determined as a pending ranking strategy (step 734), otherwise a default ranking strategy will be adopted (step 732). In the end, the two adopted ranking strategies will be returned (step 736 and 738).

Figure 7C:
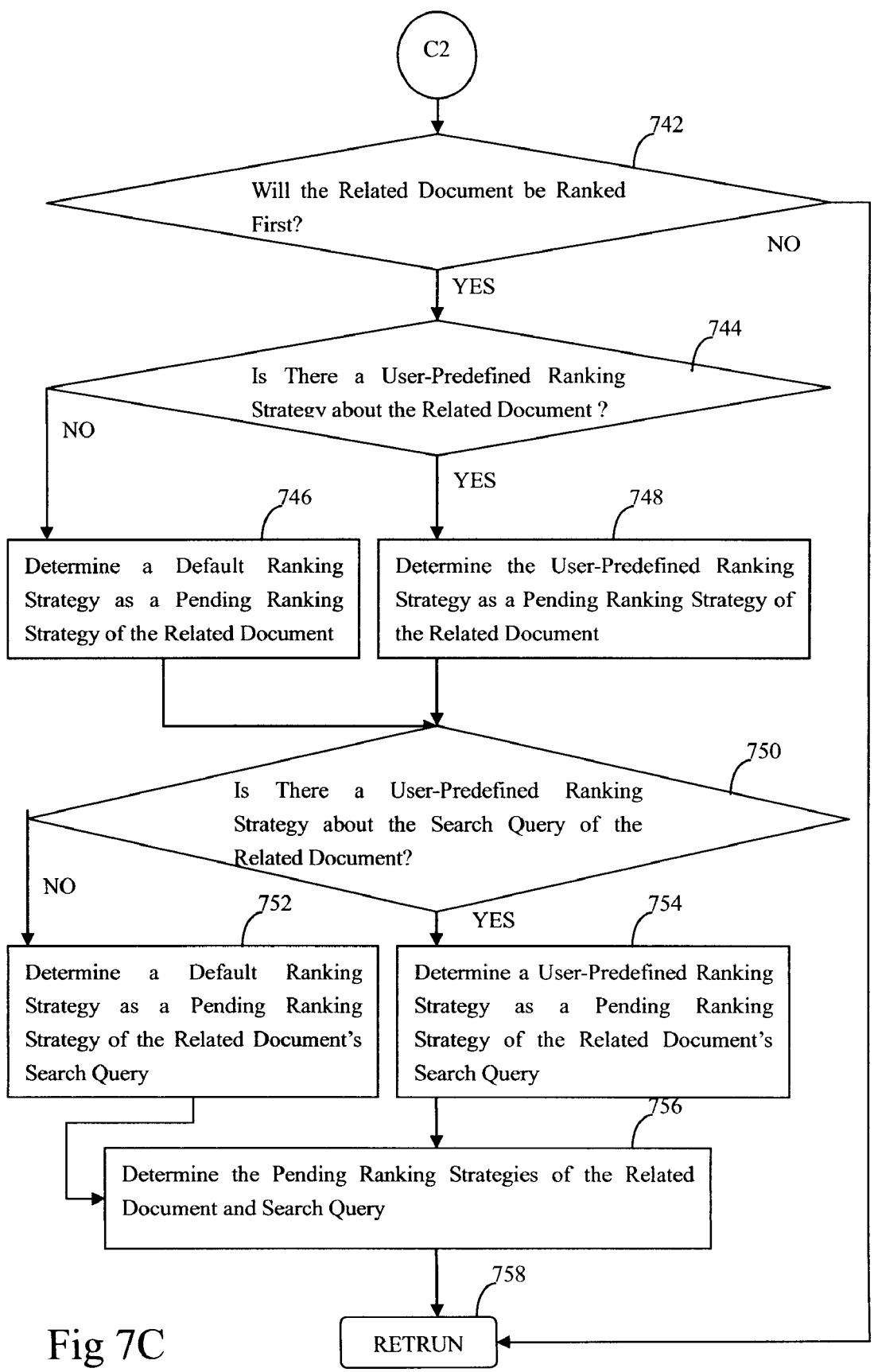
FIG. 7C illustrates a flow chart firstly determining a ranking strategy for related document(s), and secondly determining a ranking strategy for search query(s) that are indexed by the related document(s)
Figure 10B:
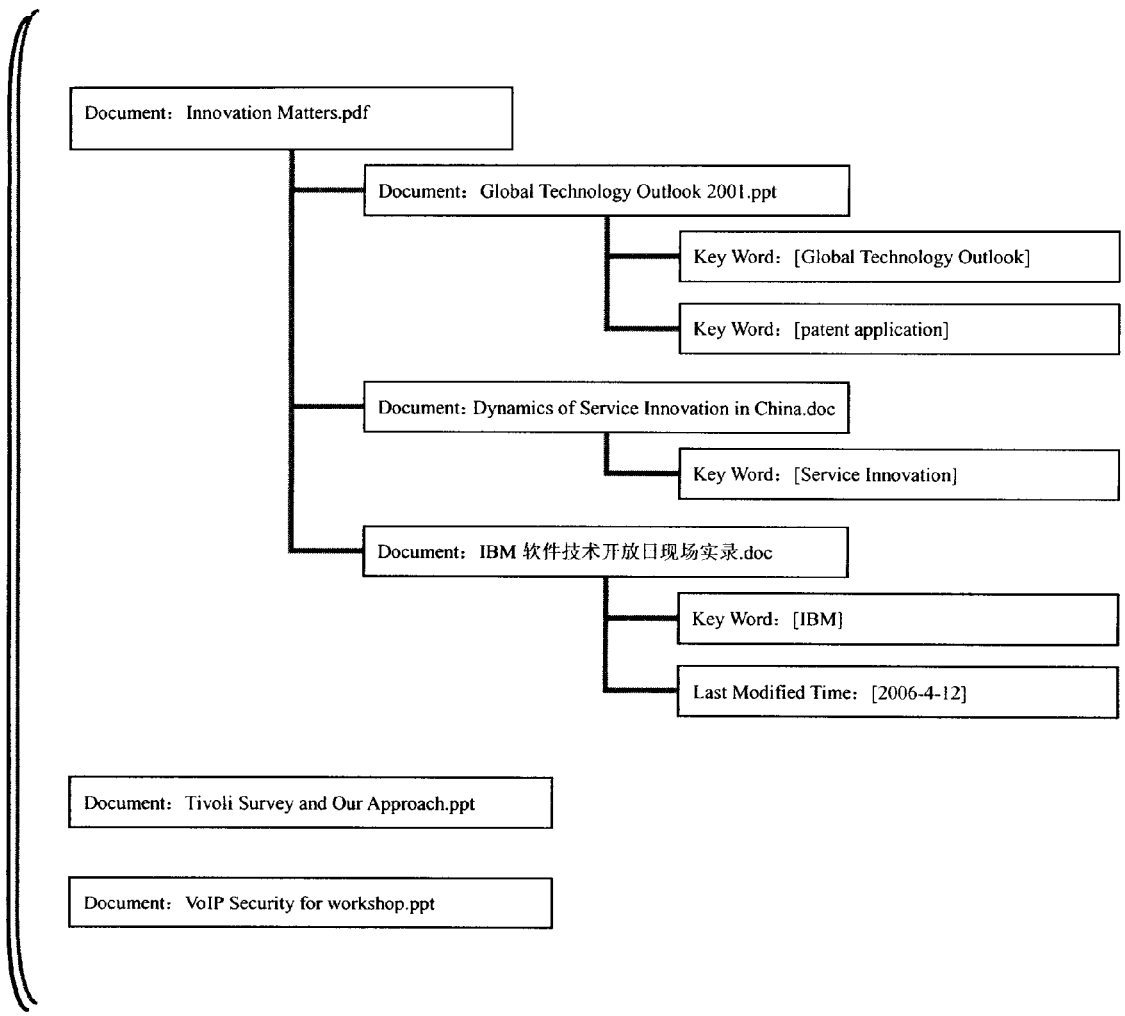

FIG. 7C corresponds to FIG. 10B. In step 742, the system decides whether it is needed to rank related document(s) first. Then, the system checks whether there is a user-predefined ranking strategy about related document(s) (step 744). If Yes, it will be adopted as a pending ranking strategy (step 748), otherwise a default ranking strategy about related document(s) will be adopted (step 746). Then, the system checks whether there is a user-predefined ranking strategy about search query(s) corresponding to each related document (step 750). Similarly, if Yes, the user-predefined ranking strategy will be adopted (step 754), otherwise a default ranking strategy about search query(s) will be adopted (752). In the end, the two adopted ranking strategies will be returned (step 756 and 758).

Figure 7D:
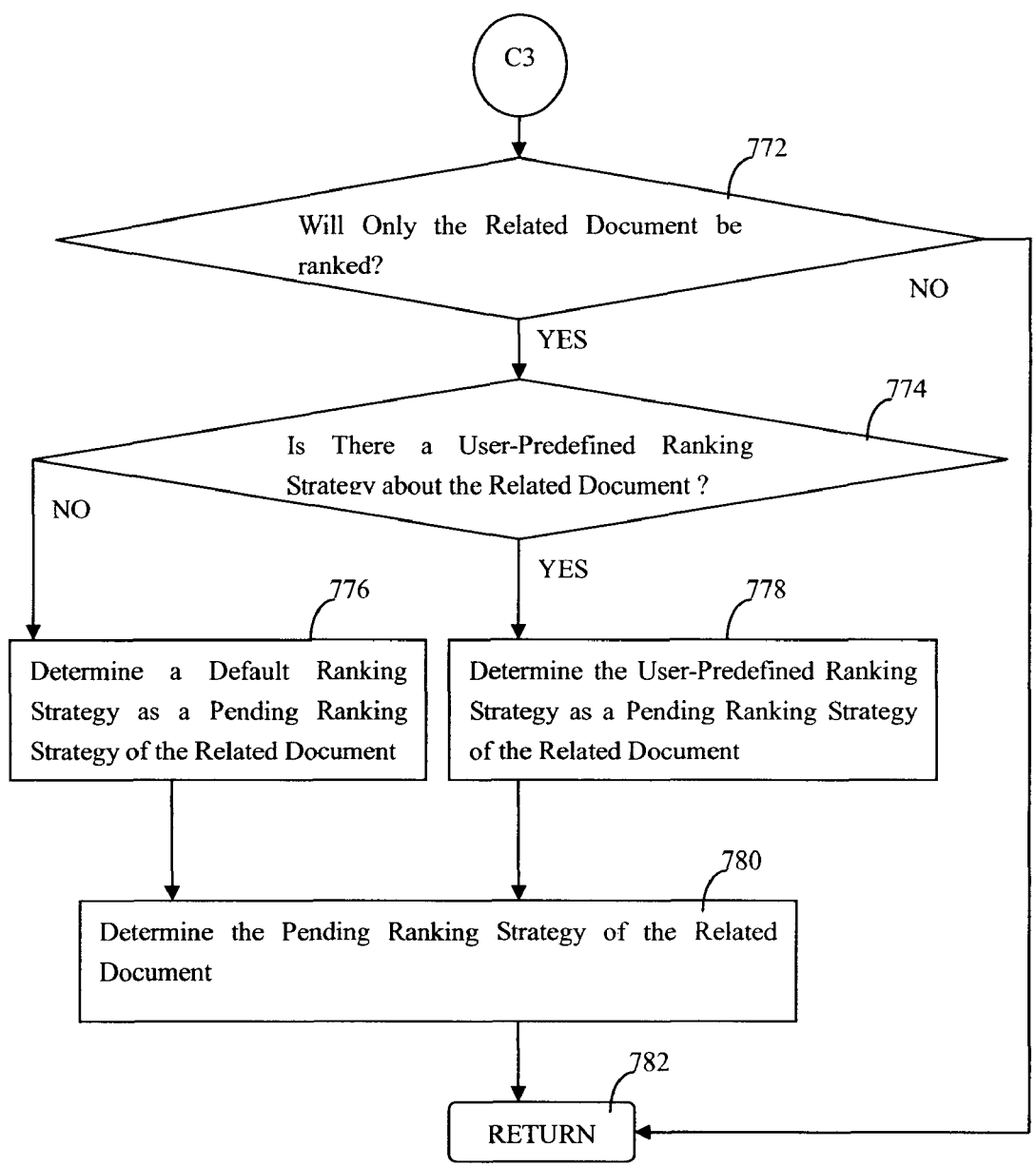
FIG. 7D illustrates a flow chart merely determining a ranking strategy for related document(s)
Figure 10C:
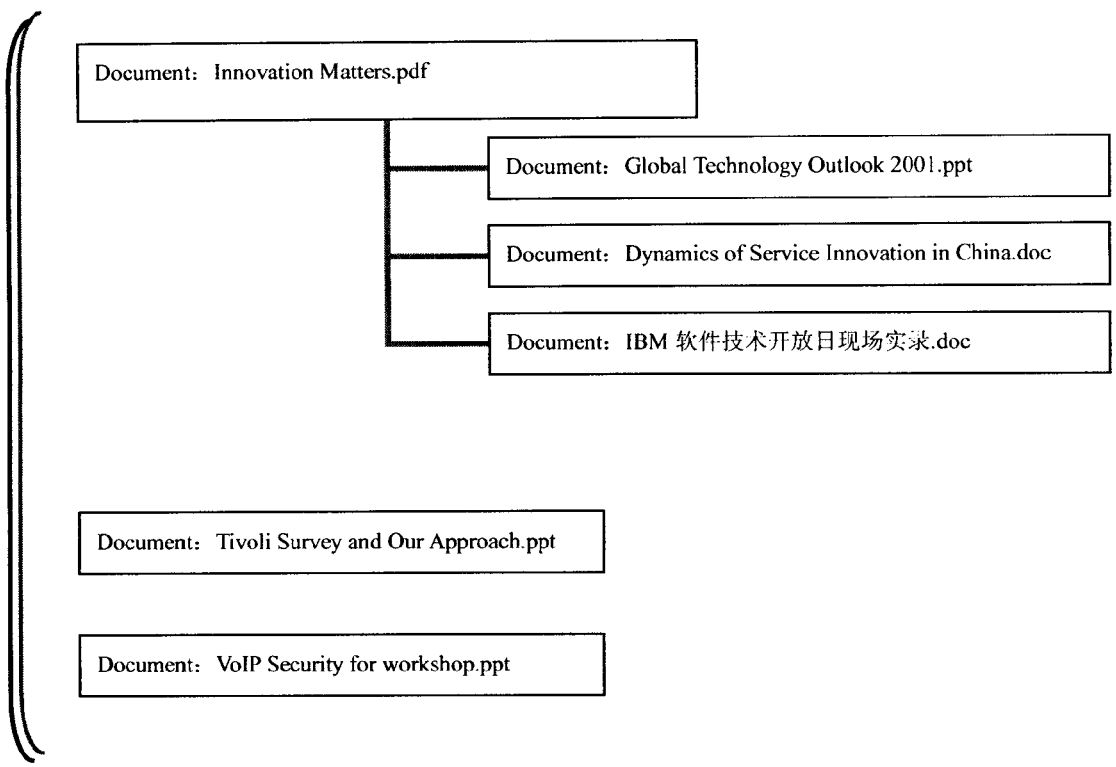

FIG. 7D corresponds to FIG. 10C. In step 772, the system decides whether only related document(s) need to be ranked. Then, the system checks whether there is a user-predefined ranking strategy about related document(s) (step 774). If yes, the user-predefined ranking strategy will be adopted as a pending ranking strategy (step 778), otherwise, a default ranking strategy about related document(s) will be adopted (step 776). In the end, the adopted ranking strategy will be returned (step 780 and 782).

Figure 8:
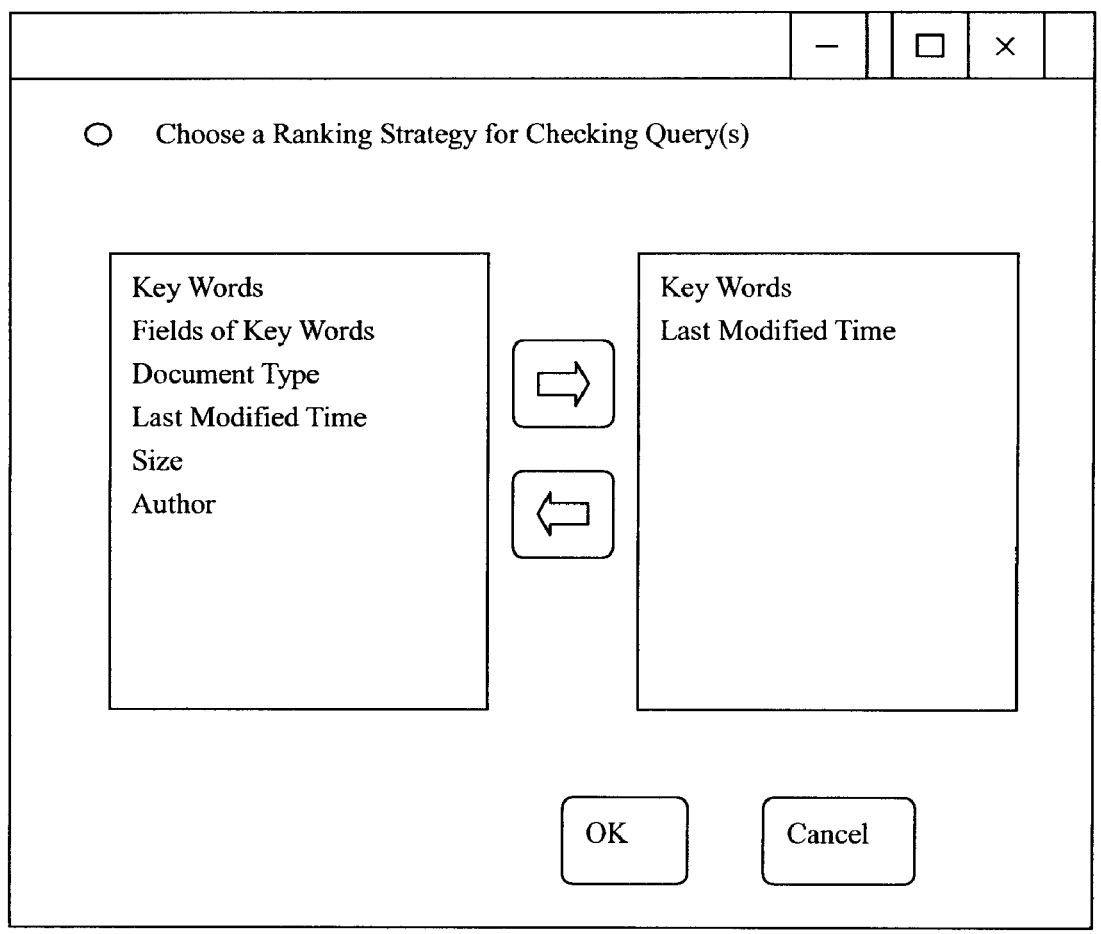
FIG. 8 illustrates a user interface screen used for choosing a ranking strategy for checking query(s)

Note that, the ranking strategy represents not only the ranking sequence of content, but also condition(s) for determining any ranked content that can be displayed. For example, in FIG. 7B and 10A, where the ranking process is conducted according to search query(s) first, the checking system needs to determine the type of search query(s) that will be returned to the user, such as search query(s) "key words" and "last modified time" in FIG. 8. After that, the system needs to determine the ranking sequence of "key words" and "last modified time". Moreover, the system also needs to determine what ranking strategy shall be applied to multiple "key words" in Table 2. In most cases, search queries are ranked according to the relevance degree between each of them and the entry document (as described above, the relevance degree between a search query and a document can be recorded in Table 2). Of course, the present invention does not exclude other ranking strategies. Preferably, the system can further set threshold(s) so that only the search queries having high degree of relevance will be ranked. After that, the system determines a ranking strategy of related document(s) according to each search query. Also preferably, although it is theoretically possible, in practice, the system does not necessarily display all the related document(s) stored in Table 2 according to each search query, rather it can set threshold(s) so that only the related document(s) having high degree of relevance will be ranked, wherein the ranking process of related documents, in most cases, can be conducted according to the relevance degree based on each search query (such as 100% and 80% in Table 2).

In the illustrations shown in FIGS. 7C, 10B, 7D, 10C, related document(s) will be ranked first. Although in most cases, ranking process will be conducted according to the average relevance degree between documents (the average relevance degree in Table 2 has been described hereinabove), the present invention does not exclude other possible ranking strategies.

Returning to FIG. 7A, in step 712, the system ranks related document(s) of the entry document, according to the adopted ranking strategies of search query(s) and related document(s), and returns a ranking result to the user (step 714). The result can be returned in different ways, such as a pop-up window in FIG. 9A, lists in FIGS. 9B and 9D, or a tree structure in FIG. 9C, or any other ways not mentioned above.

After the result is returned, the user may need to click related document(s) for browse. The log collector 350 may be used to further monitor the user's operation, and update the relevance degree between the entry document and the document clicked by the user in Table 2 according to above described method. Therefore a true state of documents relationship can be timely and exactly represented in Table 2.

Furthermore, each operation in the above can be implemented by executing program code stored a computer program product. The program product defines functions of each embodiment and contains a variety of signal, including, but not limited to: (i) information permanently stored on non-writable storage media; (ii) information stored on writable storage media; or (iii) information conveyed to a computer by a communications medium, such as through a computer or telephone network, including wireless communications. The latter embodiment specifically includes information downloaded from the Internet and other networks.

Embodiments in the present invention can provide many advantages, including those that are already illustrated in this specification, and those that can be generalized from the technical solutions. No matter whether an embodiment can realize all advantages or not, and no matter what substantial improvement is achieved regarding to such advantages, no limitation shall be made to the present invention. While the foregoing is directed to specific embodiments of the present invention for the purpose of illustration, other and further embodiments of the invention may be readily devised by one person skilled in the art without departing from the basic scope of the invention which is defined by the claims.

What is claimed is:

1. A method for establishing relationship between documents in term of a user's operation upon a document search result, wherein the document search result is obtained from a search based on one or more search queries, the method comprising:

monitoring the user's operation upon the document search result;

obtaining one or more documents selected by the user according to the operation and storing a related document list for the selected documents, the related document list being different from the document search result;

depicting a document relationship according to the related document list by using at least the one or more search queries, and creating a document relationship table stored in a document relationship repository, the table containing a relevance degree of the document relationship between at least one pair of the documents in the search result, wherein at least one of the selected documents is opened by the user for browsing, in the search result, and the relevance degree between said pair of documents is a query-based relevance degree averaged over at least two search queries; and wherein said at least one of the selected documents meets a criteria for being a related document, the criteria comprises one or more following conditions: whether the duration of the selected document being opened exceeds a predefined period; the number of times of the selected document being opened exceeds a predefined value; the selected document is opened within a predefined time frame; and the selected document is opened in a predefined opening sequence.

2. The method of claim 1, further comprising determining whether the at least one of the selected documents meets the criteria for being a related document, and if the document meets the criteria, storing the document as a related document; otherwise not storing the document as a related document.

3. The method of claim 1, further comprising:

detecting and storing extra information of the related document list, and recording the document relationship according to the related document list and the extra information.

4. The method of claim 3, wherein the extra information comprises the duration of the document being opened, the number of times that the same document is opened by the user, the time when the selected document is opened, and/or the opening sequence in which the user selected document is opened.

5. The method of claim 3, wherein recording the documents relationship comprises computing the relevance degree between documents based on at least one of the search queries, according to at least the extra information, and depicting the document relationship by using at least the one or more search queries and the relevance degree between documents.

6. A method for checking related document according to the document relationship determined by the method in claim 1, comprising:
receiving an entry document selected by a user;
checking the related document which has relationship with the entry document; and
returning a checking result which contains the related document to the user.

7. The method of claim 6, wherein returning the checking result to the user further comprises returning the one or more search queries associated with the entry document, and the related document associated with the entry document to the user, wherein the related document is indexed by the one or more search queries.

8. The method of claim 6, wherein returning the checking result to the user further comprises returning the related document associated with the entry document, and the one or more search queries associated with the entry document to the user, wherein the one or more search queries are indexed by the related document.

9. An apparatus of establishing relationship between documents in term of a user's operation upon a document search result, wherein the document search result is obtained from a search based on one or more search queries: the apparatus comprising:
a log monitor for monitoring the user's operation upon the search result, and obtaining one or more documents selected by the user according to the operation;
a log repository for storing a related document list for the selected document(s), the related document list being different from the search result;
a log analyzer for obtaining a document relationship according to the related document list and creating a document relationship table containing a relevance degree of the document relationship between at least one pair of the documents in the search result; and
a document relationship repository for storing said relevance degree of said document relationship,
wherein, the document relationship is depicted at least by using the one or more search queries; at least one of the selected documents is opened by the user for browsing, in the search result, and the relevance degree between said pair of documents is a query-based relevance degree averaged over at least two search queries; and said at least one of the documents selected meets a criteria for being a related document, the criteria comprises one or more following conditions: whether the duration of the selected document being opened exceeds a predefined period; the number of times of the selected document being opened exceeds a predefined value; the selected document is opened within a predefined time frame; and the selected document is opened in a predefined opening sequence.

10. The apparatus of claim 9, further comprising:
a means for determining whether the at least one of the documents selected by the user meets the criteria for being a related document, and if the document meets the criteria, storing the document as a related document, otherwise not storing the document as a related document.

11. The apparatus of claim 9, further comprising:
a means for detecting and storing extra information of the related document, and
a means for recording the document relationship according to the related document list and the extra information.

12. The apparatus of claim 11, wherein the extra information comprises the duration of the document being opening, the number of times that the same document is opened by the user, the time when the selected document is opened, and/or the opening sequence in which the user selected document is opened.

13. The apparatus of claim 11, wherein the means for recording the documents relationship further comprises a means for computing the relevance degree between documents according to at least one of the extra information, and depicting the documents relationship by using at least the one or more search queries and the relevance degree between documents.

14. An apparatus for checking the related document according to the document relationship determined by the apparatus in claim 9, comprising:
a means for receiving an entry document selected by a user;
a means for checking the related document which has relationship with the entry document; and
a means for returning a checking result which contains the related document to the user.

15. The apparatus of claim 14, wherein the means for returning the checking result to the user further comprises a means for returning the one or more search queries associated with the entry document, and the related document associated with the entry document to the user, wherein the related document is indexed by the one or more search queries.

16. The apparatus of claim 14, wherein the means for returning a checking result to the user further comprises a means for returning the related document associated with the entry document, and one of the search queries associated with the entry document to the user, wherein the one or more search queries are indexed by the related document.

17. A computer-readable storage medium having stored thereon a set of instructions that, when executed by a computer, results in establishing relationship between documents in term of a user's operation upon a document search result, wherein the document search result is obtained from a search based on one or more search queries, by:
monitoring a user's operation upon the search result;
obtaining one or more documents selected by the user according to the operation and storing a related document list for the selected documents, the related document list being different from the search result;
depicting a document relationship according to the related document list by using at least the one or more search queries, and
creating a document relationship table stored in a document relationship repository, the table containing a relevance degree of the document relationship between at least one pair of the documents in the search result,
wherein the relevance degree is a query-based relevance degree between said pair of documents, said relevance degree being averaged over at least two search queries;

wherein at least one of the selected documents is opened by the user for browsing, in the search result, and the relevance degree between said pair of documents is a query-based relevance degree averaged over at least two search queries; and wherein said at least one of the selected documents meets a criteria for being a related document, the criteria comprises one or more following conditions: whether the duration of the selected document being opened exceeds a predefined period; the number of times of the selected document being opened exceeds a predefined value; the selected document is opened within a predefined time frame; and the selected document is opened in a predefined opening sequence.

* * * * *